United States Patent
Wiseman

(10) Patent No.: US 11,733,116 B2
(45) Date of Patent: *Aug. 22, 2023

(54) DIRECTIONAL DIFFERENTIAL PRESSURE DETECTOR

(71) Applicant: AirFlow Direction, Inc., West Newbury, MA (US)

(72) Inventor: Brian M. Wiseman, West Newbury, MA (US)

(73) Assignee: AirFlow Direction, Inc., West Newbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,607

(22) Filed: Apr. 22, 2022

(65) Prior Publication Data

US 2022/0244124 A1 Aug. 4, 2022

Related U.S. Application Data

(63) Continuation of application No. 17/073,294, filed on Oct. 17, 2020, now Pat. No. 11,340,127.
(Continued)

(51) Int. Cl.
*G01L 13/04* (2006.01)
*G01L 13/00* (2006.01)

(52) U.S. Cl.
CPC .............. *G01L 13/04* (2013.01); *G01L 13/00* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 2,497,255 A 2/1950 Brown
5,195,376 A 3/1993 Banks et al.
(Continued)

FOREIGN PATENT DOCUMENTS

CN 2200816 Y 6/1995
FR 2 428 845 A1 1/1980
(Continued)

OTHER PUBLICATIONS

Invitation to Pay Additional Fees for International Application No. PCT/US2020/056193, dated Dec. 9, 2020.
(Continued)

*Primary Examiner* — Andre J Allen
(74) *Attorney, Agent, or Firm* — Wolf, Greenfield & Sacks, P.C.

(57) ABSTRACT

Methods and apparatuses for indicating the presence of a threshold directional differential pressure between separated adjacent spaces. An inclined conduit contains at least one movable element that indicates whether the pressure difference between the two spaces is at least as high as a threshold pressure difference. The apparatus may include an on-board pitch indicator and a roll indicator which are used together to calibrate the apparatus and its installation. The apparatus may provide only one or more discrete number of pressure difference set points and be non-adjustable once installed. The inclined conduit may be non-rotatable relative to the baseplate, and the baseplate may be rotatable to change threshold pressure difference set points. The apparatus may provide a tamper-resistant indication of whether a threshold pressure differential is present.

30 Claims, 12 Drawing Sheets

Related U.S. Application Data

(60) Provisional application No. 62/924,679, filed on Oct. 22, 2019, provisional application No. 62/923,464, filed on Oct. 18, 2019.

(58) Field of Classification Search
CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 16/0023; G01L 19/142; G01L 7/043; G01L 19/08; G01L 9/0002; G01L 9/008; G01L 19/02; G01L 19/141; G01L 9/006; G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 27/007; G01L 11/00; G01L 27/002; G01L 9/0026; G01L 19/00; G01L 9/0089; G01L 9/045; G01L 9/14; G01L 1/2281; G01L 11/025; G01L 11/008; G01L 19/0654; G01L 7/22; G01L 9/0047; G01L 13/026; G01L 9/0076; G01L 9/0025; G01L 9/0035; G01L 13/00; G01L 19/0061; G01L 9/0005; G01L 9/10; G01L 9/0019; G01L 9/08; G01L 11/006; G01L 21/00; G01L 7/08; G01L 9/0041; G01L 9/04; G01L 9/0008; G01L 11/004; G01L 19/083; G01L 19/086; G01L 9/0057; G01L 1/18; G01L 19/069; G01L 19/10; G01L 19/16; G01L 13/023; G01L 7/048; G01L 9/0016; G01L 9/0027; G01L 9/0086; G01L 9/0048; G01L 19/06; G01L 9/0079; G01L 11/04; G01L 9/00; G01L 9/0091; G01L 23/24; G01L 7/182; G01L 11/002; G01L 19/0663; G01L 27/00; G01L 7/166; G01L 1/20; G01L 23/22; G01L 9/0036; G01L 1/02; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 9/0083; G01L 9/0098; G01L 1/142; G01L 7/24; G01L 1/2293; G01L 9/0029; G01L 21/22; G01L 9/02; G01L 7/022; G01L 9/0064; G01L 23/08; G01L 23/16; G01L 5/14; G01L 7/088; G01L 7/163; G01L 9/0007; G01L 1/205; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 1/2231; G01L 13/028; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 23/00; G01L 9/0094; G01L 1/24; G01L 9/0082; G01L 1/125; G01L 1/26; G01L 11/06; G01L 9/0097; G01L 1/2268; G01L 21/30; G01L 21/34; G01L 23/221; G01L 7/20; G01L 19/144; G01L 23/26; G01L 7/068; G01L 1/144; G01L 1/225; G01L 23/32; G01L 7/14; G01L 1/165; G01L 23/12; G01L 7/187; G01L 1/146; G01L 1/241; G01L 7/045; G01L 1/086; G01L 7/108; G01L 13/04; G01L 17/005; G01L 5/18; G01L 9/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/0052; G01L 5/162; G01L 5/225; G01L 7/026; G01L 7/065; G01L 9/0014; G01L 1/242; G01L 21/24; G01L 3/10; G01L 5/0004; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| | | |
|---|---|---|
| 5,291,182 A | 3/1994 | Wiseman |
| 5,410,298 A | 4/1995 | Wiseman |
| 5,522,261 A | 6/1996 | Grover et al. |
| 5,589,643 A | 12/1996 | Pyle |
| 5,661,461 A | 8/1997 | Wiseman |
| 5,787,919 A | 8/1998 | Pyle |
| 5,798,697 A | 8/1998 | Wiseman |
| 6,725,731 B2 | 4/2004 | Wilklund et al. |

(56) References Cited

U.S. PATENT DOCUMENTS

| | | |
|---|---|---|
| 8,910,516 B2 | 12/2014 | Wiseman |
| 9,395,260 B2 | 7/2016 | Pyle |
| 10,191,077 B2 | 1/2019 | Wiseman |
| 10,571,482 B2 | 2/2020 | Wiseman |
| 10,690,560 B2 | 6/2020 | Wiseman |
| 10,942,197 B2 | 3/2021 | Wiseman |
| 11,415,475 B2 | 8/2022 | Wiseman |
| 11,415,477 B2 | 8/2022 | Wiseman |
| 11,415,594 B2 | 8/2022 | Wiseman |
| 11,423,918 B2 | 8/2022 | Wiseman |
| 11,454,644 B2 | 9/2022 | Wiseman |
| 2014/0260594 A1 | 9/2014 | Wiseman |
| 2015/0059464 A1 | 3/2015 | Wiseman |
| 2017/0067929 A1 | 3/2017 | Wiseman |
| 2018/0164174 A1 | 6/2018 | Wiseman |
| 2019/0154724 A1 | 5/2019 | Wiseman |
| 2020/0158749 A1 | 5/2020 | Wiseman |
| 2020/0278268 A1 | 9/2020 | Wiseman |
| 2020/0378854 A1 | 12/2020 | Wiseman |
| 2020/0379000 A1 | 12/2020 | Wiseman |
| 2020/0379001 A1 | 12/2020 | Wiseman |
| 2021/0247257 A1 | 8/2021 | Wiseman |
| 2022/0178777 A1 | 6/2022 | Wiseman |

FOREIGN PATENT DOCUMENTS

| | | |
|---|---|---|
| WO | WO 2014/150755 A1 | 9/2014 |
| WO | WO 2015/179516 A1 | 11/2015 |
| WO | WO 2018/098339 A1 | 5/2018 |
| WO | WO 2020/243512 A1 | 12/2020 |

OTHER PUBLICATIONS

International Search Report and Written Opinion for International Application No. PCT/US2020/056193, dated Mar. 8, 2021.

[No Author Listed] Preqator; From The Wayback Machine. Screenshots taken Oct. 5, 2021 at https://web.archive.org/web/20131126025813/http://preqatool.se/Preqatool/Preqator.html of Wayback Machine Capture for http://preqatool.se/Preqatool/Preqator.html dated Nov. 26, 2013, 3 pages.

[No Author Listed] Preqator; From The Wayback Machine. Screenshots taken Oct. 5, 2021 at https://web.archive.org/web/20161026213515/http://preqatool.se/Preqatool/Preqator.html of Wayback Machine Capture for http://preqatool.se/Preqatool/Preqator.html dated Oct. 26, 2016, 3 pages.

[No Author Listed] Preqator; www.preqatool.se/Preqatool/Preqator.html. Screenshots taken Oct. 5, 2021, 3 pages.

[No Author Listed] Preqator-Original; www.preqatool.se/Preqatool/Preqator-Original.html. Screenshots taken Oct. 5, 2021, 3 pages.

[No Author Listed] Preqator-med hållare; www.preqatool.se/Preqatool/Preqator-med_hallare.html; Screenshots taken Oct. 5, 2021, 6 pages.

[No Author Listed] Preqator-med Hållare (alt. 1); http://preqatool.se/Preqatool/Preqator-med_2_Hallare_(alt_1).html. Screenshots taken Oct. 5, 2021, 2 pages.

[No Author Listed] Preqator-med Hållare (alt. 2); http://preqatool.se/Preqatool/Preqator_-med_2_Hallare_alt._2).html. Screenshots taken Oct. 5, 2021, 2 pages.

[No Author Listed] Bestsålling; http://preqatool.se/Preqatool/BESTALLNING.html. Screenshots taken Oct. 5, 2021, 2 pages.

[No Author Listed] Preqator; www.preqatool.se/Preqatool/Preqator.html. Webpage printed Oct. 9, 2020, 3 pages.

[No Author Listed] Preqator-Original; www.preqatool.se/Preqatool/Preqator-Original.html. Webpage printed Oct. 9, 2020, 3 pages.

[No Author Listed] Preqator-med hållare; www.preqatool.se/Preqatool/Preqator-med_hallare.html. Webpage printed Oct. 9, 2020, 4 pages.

[No Author Listed] Preqator-med Hållare (alt. 1); http://preqatool.se/Preqatool/Preqator-med_2_Hallare_(alt_1).html. Webpage printed Oct. 9, 2020, 2 pages.

[No Author Listed] Preqator-med Hållare (alt. 2); http://preqatool.se/Preqatool/Preqator_-med_2_Hallare_alt._2).html. Webpage printed Oct. 9, 2020, 2 pages.

DIRECTIONAL DIFFERENTIAL PRESSURE DETECTOR

RELATED APPLICATIONS

This application is a continuation of U.S. application Ser. No. 17/073,294, filed Oct. 17, 2020, which claims the benefit of priority under 35 U.S.C. § 119(e) to U.S. Provisional Application Ser. No. 62/923,464, filed on Oct. 18, 2019, and to U.S. Provisional Application Ser. No. 62/924,679, filed on Oct. 22, 2019, each of which is hereby incorporated by reference in its entirety.

FIELD

Disclosed embodiments relate to methods and apparatuses for detecting the presence of a directional differential pressure.

DISCUSSION OF THE RELATED ART

Various applications within hospitals, laboratories, pharmaceutical facilities, clean room facilities, etc., often require a particular direction of air flow or differential pressure to be maintained, such as between neighboring rooms, compartments, corridors, ducts, or other spaces. The pressure of a room relative to adjacent space(s) will determine the net direction of air flow through an opening into or out of the room.

For example, a hospital operating room may be kept under a positive pressure so that air flows out of the room, thereby preventing unfiltered or contaminated air from entering the room from adjacent spaces. This positive pressure is accomplished by supplying clean air to the operating room at a greater flow rate than the flow rate at which air is exhausted from the room by the room's ventilation system.

Or, if a hospital patient is infected with an airborne communicable pathogen, a patient isolation room may be kept under a negative pressure which is accomplished when the rate at which potentially contaminated air is exhausted from the room is greater than the rate at which air is supplied to the room from the room's ventilation system. Such a negative pressure arrangement, where the room is under a comparatively lower pressure than its immediate surroundings, prevents potentially contaminated air from exiting the room and escaping into surrounding space(s).

The net differential pressure between rooms will cause air to flow through an opening from one room to the other in the direction from a higher pressure to a lower pressure. The desired degree of differential pressure to be maintained between rooms, compartments, corridors, etc. will vary, depending on the application.

Accordingly, it is often desirable to closely monitor the general direction of potential or actual air flow between compartments and in some cases the particular magnitude of differential pressure causing the net air flow.

SUMMARY

According to one embodiment, a device for indicating a presence of a directional differential pressure between a first space and a second space separated from the first space by a barrier is disclosed. The device includes a baseplate configured to be secured to the barrier such that the baseplate is not rotatable relative to the barrier while secured to the barrier. A first conduit portion is configured to be in fluidic connection with the first space. A second conduit portion fluidically connected to the first conduit portion and configured to be in fluidic connection with the second space. The second conduit portion is connected to the baseplate and the second conduit portion is inclined at an angle relative to a horizontal plane when the baseplate is oriented vertically. Whenever the baseplate is secured to the barrier such that the baseplate is not rotatable relative to the barrier, the angle of the second conduit portion relative to the horizontal plane is not adjustable. At least one movable element is disposed within the second conduit portion and movable from a first, vertically lower region of the second conduit portion to a second, vertically higher region of the second conduit portion in response to the directional differential pressure between the first and second spaces being greater than a threshold differential pressure.

According to another embodiment, a device for indicating a presence of a directional differential pressure between a first space and a second space separated from the first space by a barrier is disclosed. The device includes a baseplate configured to be secured to the barrier such that the baseplate is not rotatable relative to the barrier while secured to the barrier. The device also includes an inclined conduit connected to the baseplate and configured to be fluidically connected to the first and second spaces. The inclined conduit is connected to the baseplate, and the inclined conduit is inclined at an angle relative to a horizontal plane when the baseplate is oriented vertically. Whenever the baseplate is secured to the barrier such that the baseplate is not rotatable relative to the barrier, the angle of the inclined conduit relative to the horizontal plane is not adjustable. The device is configured such that no part of the device protrudes into the barrier when the device is mounted to a flat, vertical barrier having an opening in the barrier. At least one movable element is disposed within the inclined conduit and movable from a first, vertically lower region of the inclined conduit to a second, vertically higher region of the inclined conduit in response to the directional differential pressure between the first and second spaces being greater than a threshold differential pressure.

According to a further embodiment, a device for indicating a presence of a directional differential pressure between a first space and a second space separated from the first space by a barrier is disclosed. The device includes a first conduit portion configured to be in fluidic connection with the first space and configured to be secured to the barrier such that the first conduit portion is not rotatable relative to the barrier while secured to the barrier. The device also includes a second conduit portion fluidically connected to the first conduit portion and configured to be in fluidic connection with the second space. The second conduit portion is inclined at an angle relative to the first conduit portion. Whenever the first conduit portion is secured to the barrier such that the first conduit portion is not rotatable relative to the barrier, the angle of the second conduit portion relative to the horizontal plane is not adjustable. At least one movable element is disposed within the second conduit portion and movable from a first, vertically lower region of the second conduit portion to a second, vertically higher region of the second conduit portion in response to the directional differential pressure between the first and second spaces being greater than a threshold differential pressure.

According to one embodiment, a device for indicating a presence of a directional differential pressure between a first space and a second space separated from the first space by a barrier is disclosed. The device includes a baseplate configured to be secured to the barrier such that the baseplate is not rotatable relative to the barrier while secured to the barrier. The device also includes a conduit support integrally formed with the baseplate. An inclined conduit portion is supported by the conduit support and configured to be fluidically connected to the first space and the second space. The inclined conduit portion is inclined at an angle relative to a horizontal plane when the baseplate is oriented vertically. At least one movable element is disposed within the inclined conduit portion and movable from a first, vertically lower region of the inclined conduit portion to a second, vertically higher region of the inclined conduit portion in response to the directional differential pressure between the first and second spaces being greater than a threshold differential pressure.

According to yet another embodiment, a device for indicating a presence of a directional differential pressure between a first space and a second space separated from the first space by a barrier is disclosed. The device includes a baseplate configured to be secured to the barrier such that the baseplate is not rotatable relative to the barrier while secured. An inclined conduit is connected to the baseplate and configured to be fluidically connected to the first and second spaces. The inclined conduit is inclined at an angle relative to a horizontal plane when the baseplate is oriented vertically. A roll indicator is configured to indicate whether the baseplate is oriented at a desired roll orientation. The baseplate includes a plurality of baseplate mounting component sets configured to be aligned with a set of barrier mounting components. The baseplate mounting component sets are arranged such that the baseplate is securable to the barrier in a first roll orientation by aligning a first set of baseplate mounting components of the plurality of baseplate mounting component sets with a first barrier mounting component set, and securing the baseplate to the barrier using the first set of baseplate mounting components and the first set of barrier mounting components. The baseplate mounting component sets are arranged such that the baseplate is securable to the barrier in a second roll orientation, different from the first roll orientation, by aligning the first barrier mounting component set with a second baseplate mounting component set other than the first baseplate mounting component set, and securing the baseplate to the barrier using the first set of barrier mounting components and the second set of baseplate mounting components. At least one movable element is disposed within the inclined conduit and movable from a first, vertically lower region of the inclined conduit to a second, vertically higher region of the inclined conduit in response to the directional differential pressure between the first and second spaces being greater than a threshold differential pressure.

According to a further embodiment, a device for indicating a presence of a directional differential pressure between a first space and a second space separated from the first space by a barrier is disclosed. The device includes a baseplate configured to be secured to the barrier such that the baseplate is not rotatable relative to the barrier while secured to the barrier. An inclined conduit is connected to the baseplate and configured to be fluidically connected to the first and second spaces. The inclined conduit is inclined at an angle relative to a horizontal plane when baseplate is oriented vertically. Whenever the baseplate is secured to the barrier such that the baseplate is not rotatable relative to the barrier, the angle of the inclined conduit relative to the horizontal plane is not adjustable. A roll indicator configured to indicate whether the baseplate is oriented at a desired roll orientation. The baseplate includes a plurality of baseplate mounting components configured to be aligned with complementary barrier mounting components. The baseplate mounting components are arranged such that the baseplate is securable to the barrier in a first roll orientation by aligning a first baseplate mounting component of the plurality of baseplate mounting components with a first barrier mounting component and aligning a second baseplate mounting component of the plurality of baseplate mounting components with a second barrier mounting component, and securing the baseplate to the barrier using the first and second baseplate mounting components and the first and second barrier mounting components. The baseplate mounting components are arranged such that the baseplate is securable to the barrier in a second roll orientation, different from the first roll orientation, by aligning the first baseplate mounting component with a barrier mounting component other than the first barrier mounting component, and aligning the second baseplate mounting component with a barrier mounting component other than the second barrier mounting component. At least one movable element is disposed within the inclined conduit and movable from a first, vertically lower region of the inclined conduit to a second, vertically higher region of the inclined conduit in response to the directional differential pressure between the first and second spaces being greater than a threshold differential pressure.

According to yet another embodiment, a method of mounting a device to a barrier is disclosed. The device is configured to indicate a presence of a directional differential pressure between a first space and a second space separated from the first space by the barrier, wherein the device comprises a baseplate configured to be secured to the barrier such that the baseplate is not rotatable relative to the barrier while secured, an inclined conduit connected to the baseplate and configured to be fluidically connected to the first and second spaces, a roll indicator configured to indicate whether the baseplate is oriented at a desired roll orientation, and at least one movable element disposed within the inclined conduit and movable from a first, vertically lower region of the inclined conduit to a second, vertically higher region of the inclined conduit in response to the directional differential pressure between the first and second spaces being greater than a threshold differential pressure. The method includes orienting the baseplate on the barrier in a first roll orientation such that the roll indicator indicates that the baseplate is oriented at a desired roll orientation. The method further includes, with the baseplate is in the first orientation, forming first and second holes in the barrier using first and second openings in the baseplate as guides for forming the first and second holes in the barrier. The method further includes reorienting the base plate to a second rule orientation search that third and fourth openings in the baseplate align with the first and second holes in the barrier. Also included is inserting fasteners through the third and fourth openings in the baseplate and into the first and second holes in the barrier and securing the baseplate to the wall.

According to one embodiment, a device for indicating a presence of a directional differential pressure between a first space and a second space separated from the first space by a barrier is disclosed. The device includes a baseplate configured to be secured to the barrier such that the baseplate is not rotatable relative to the barrier while secured to the barrier. An inclined conduit is connected to the baseplate and configured to be fluidically connected to the first and second spaces. The inclined conduit is connected to the baseplate. The inclined conduit is inclined at an angle relative to a horizontal plane when the baseplate is oriented vertically. The baseplate includes first and second arc-shaped slots configured to receive first and second fasteners, respectively, the first and second arc-shaped slots being arranged such that with the first fastener received in the first arc-shaped slot and partially inserted into the barrier at a first barrier mounting location, and with the second fastener received in the second arc-shaped slot and partially inserted into the barrier at a second barrier mounting location, the baseplate is rotatable relative to the barrier. The baseplate is configured to be secured to the barrier when the fasteners are tightened against the baseplate. At least one movable element is disposed within the inclined conduit and movable from a first, vertically lower region of the inclined conduit to a second, vertically higher region of the inclined conduit in response to the directional differential pressure between the first and second spaces being greater than a threshold differential pressure.

According to one embodiment, a device for indicating a presence of a directional differential pressure between a first space and a second space separated from the first space by a barrier is provided. The device includes a first conduit portion configured to pass through at least a portion of a barrier. The device also includes a second conduit portion fluidly connected to the first conduit portion, wherein the second conduit portion is inclined relative to the first conduit portion, and any rotation of the second conduit portion rotates the first conduit portion. At least one movable element is disposed within the second conduit portion and is movable from a first, vertically lower region of the second conduit portion to a second, vertically higher region of the second conduit portion in response to the directional differential pressure between the first and second spaces being greater than a threshold differential pressure.

According to another embodiment, a device for indicating a presence of a directional differential pressure between a first space and a second space separated from the first space by a barrier is provided. The device includes a first conduit portion configured to pass through at least a portion of a barrier. The device also includes a second conduit portion fluidly connected to the first conduit portion and attached to a baseplate which is mountable to the barrier, wherein the second conduit portion is inclined relative to the first conduit portion, and any rotation of the second conduit portion requires rotation of the baseplate. At least one movable element is disposed within the second conduit portion and is movable from a first, vertically lower region of the second conduit portion to a second, vertically higher region of the second conduit portion in response to the directional differential pressure between the first and second spaces being greater than a threshold differential pressure.

According to a further embodiment, a device for indicating a presence of a directional differential pressure between a first space and a second space separated from the first space by a barrier is provided. The device includes a first conduit portion configured to pass through at least a portion of a barrier. The device additionally includes a second conduit portion fluidly connected to the first conduit portion and attached to a baseplate which is mountable to the barrier, wherein the second conduit portion is inclined relative to the first conduit portion, and any rotation of the second conduit portion requires rotation of the baseplate. At least one movable element is disposed within the second conduit portion and movable from a first, vertically lower region of the second conduit portion to a second, vertically higher region of the second conduit portion in response to the directional differential pressure between the first and second spaces being greater than a threshold differential pressure.

According to yet another embodiment, a device for indicating a presence of a directional differential pressure between a first space and a second space separated from the first space by a barrier is provided. The device includes a first conduit portion and a second conduit portion. the second conduit portion is fluidly connected to the first conduit portion and attached to a baseplate which is mountable to the barrier, wherein the second conduit portion is inclined relative to the first conduit portion, and any rotation of the second conduit portion requires rotation of the baseplate. At least one movable element is disposed within the second conduit portion and movable from a first, vertically lower region of the second conduit portion to a second, vertically higher region of the second conduit portion in response to the directional differential pressure between the first and second spaces being greater than a threshold differential pressure.

According to a further embodiment, a device for indicating a presence of a directional differential pressure between a first space and a second space separated from the first space by a barrier is provided. The device includes an inclined conduit portion attached to a baseplate which is mountable to the barrier, wherein the inclined conduit portion is rotationally fixed to the baseplate such that an angle of inclination of the inclined conduit portion relative to the baseplate is not adjustable. The device also includes at least one movable element disposed within the inclined conduit portion and movable from a first, vertically lower region of the inclined conduit portion to a second, vertically higher region of the inclined conduit portion in response to the directional differential pressure between the first and second spaces being greater than a threshold differential pressure.

Advantages, novel features, and objects of the present disclosure will become apparent from the following detailed description of the present disclosure when considered in conjunction with the accompanying drawings, which are schematic and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF DRAWINGS

The accompanying drawings are not intended to be drawn to scale. In the drawings, each identical or nearly identical component that is illustrated in various figures is represented by a like numeral. Various embodiments of the present disclosure will now be described, by way of example, with reference to the accompanying drawings. The embodiments and drawings shown are not intended to narrowly define the present disclosure. In the drawings.

DETAILED DESCRIPTION

Figure 1:
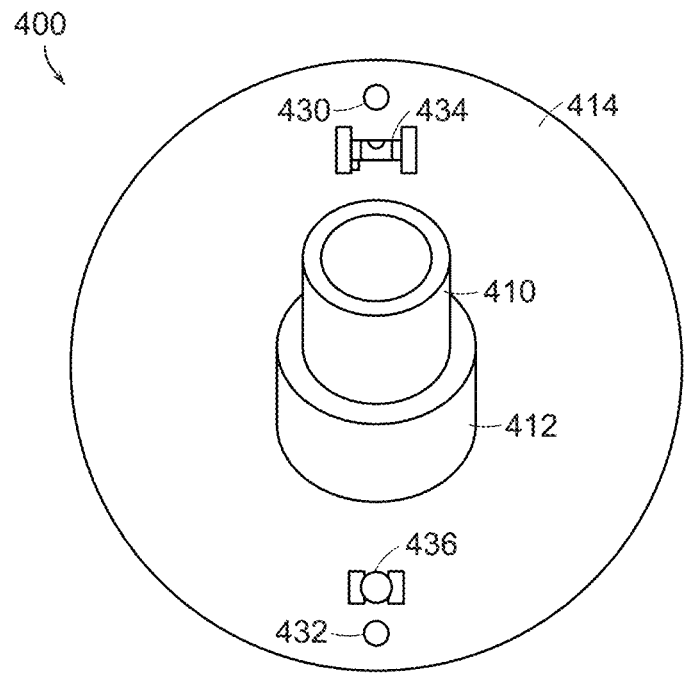
FIG. 1 is a front view of one embodiment of a device for indicating a directional differential pressure, the device being installed in a first orientation.
Figure 2:
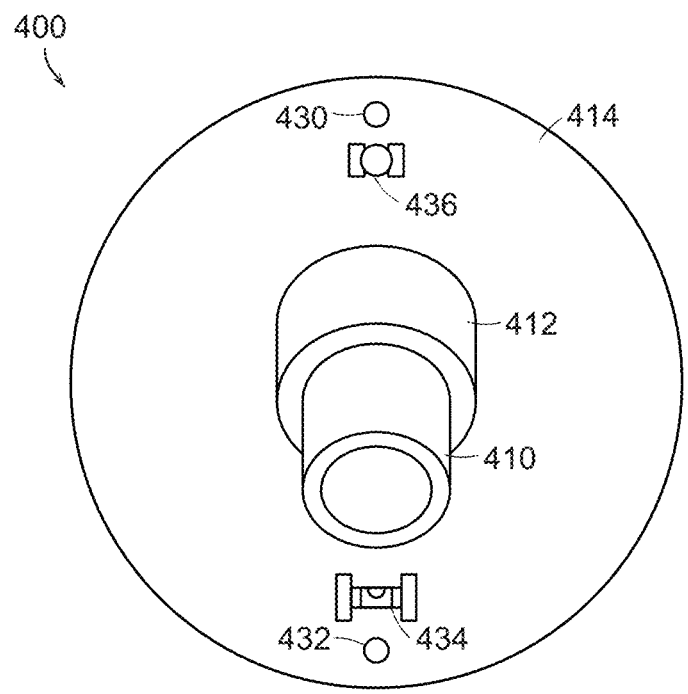
FIG. 2 is a front view of the embodiment of FIG. 1 with the device installed in a second orientation.
Figure 3:
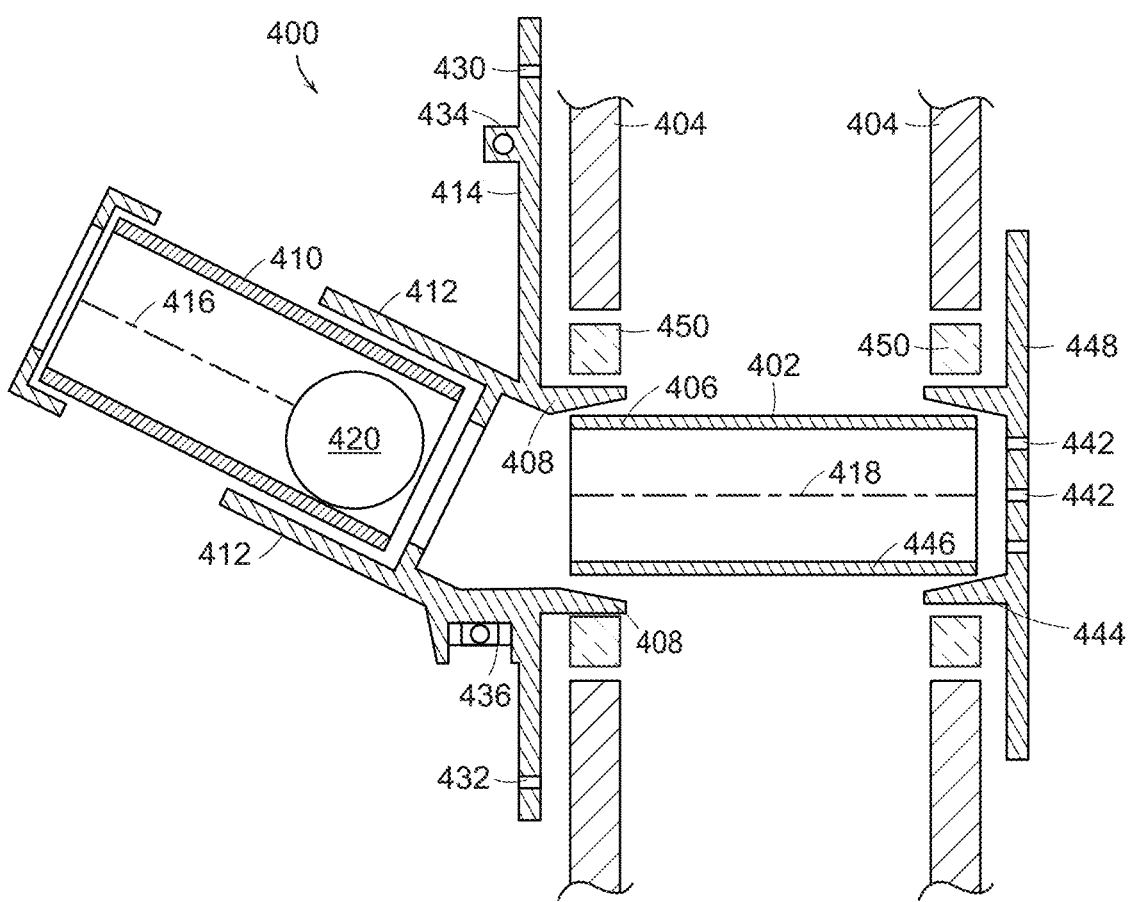
FIG. 3 is a cross-sectional side view of the embodiment of FIG. 1 in the installed orientation shown in FIG. 1.
Figure 4:
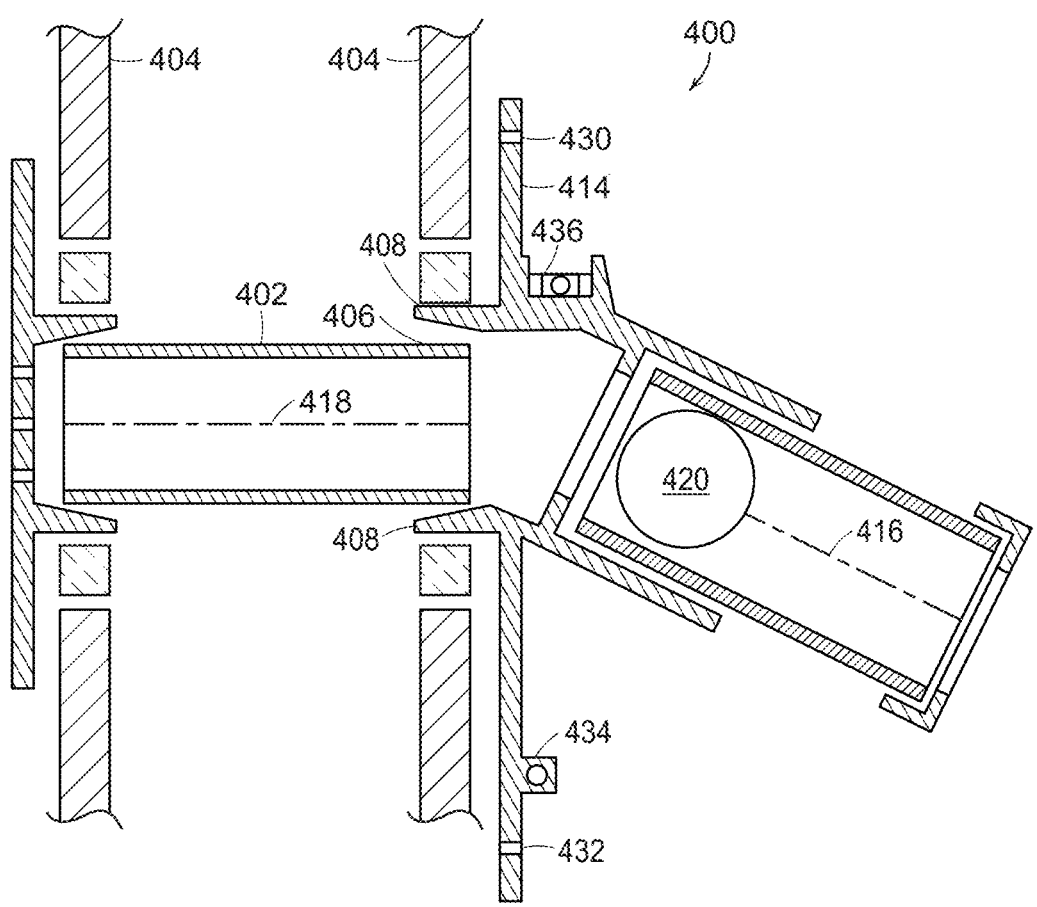
FIG. 4 is a cross-sectional side view of the embodiment of FIG. 1 in the installed orientation shown in FIG. 2.

The present disclosure relates to devices and systems which provide an indication of potential or actual directional air flow and/or whether a particular degree of directional differential pressure exists between spaces (e.g., two neighboring rooms or a room and an adjacent corridor) separated by a barrier such as a wall. In some embodiments, the device includes a first component located on a first side of a barrier, and a second component located on a second side of the barrier such that each component is subject to the air pressure within its respective space. The overall device is adapted to react to pressure differences between the two spaces to provide an indication to a viewer of the device. In some embodiments, the device may include sensors which communicate a status to a remote device.

An air flow conduit may extend from one space to another space (e.g., room to hallway). According to some embodiments, a visual indicator such as a lightweight ball or other movable element moves within the conduit in response to differences in air pressures between the two spaces. For example, in some embodiments, the air pressure in a room may be higher than in an adjacent hallway, and if the difference surpasses a threshold pressure, the movable element may move toward an end of the conduit to indicate the pressure difference exceeding the threshold.

An air flow conduit does not necessarily require that the conduit be arranged to permit air to be transferred from one space to another. Instead, the pressures on opposite sides of a wall may communicate without air flow moving all the way through the air flow conduit. For example, a conduit may pass from a hallway to a room, and a piston may be positioned with within the conduit. If pressure in the room is sufficiently higher than in the hallway to surpass a threshold pressure differential, the piston may move toward the hallway and be visible within the conduit in the hallway. If the piston is sealed within the interior of the conduit, no room air escapes into the hallway space, though a small amount of air flows behind the piston within the conduit. In this manner, the air flow conduit may provide a fluidic connection between two spaces where some minor air flow occurs within the conduit, yet no air is transmitted from one space to the other.

As discussed further below, in other embodiments, the fluidic connection may allow air to be transmitted between two spaces until a ball seats against an end of a conduit. In still further embodiments, air flow from one space to another even when a ball (or other movable element) reaches the end of its travel path.

In some embodiments, a device for indicating a differential pressure between two spaces includes one or more conduits in communication with the air in both spaces such that a movable element disposed in the conduit(s) can react to directional air flow caused by the differential pressure. As described further herein, the conduit(s) may extend through the wall, and adjustability of the incline of portions of the device may reside on both sides or a single side of the wall. In some embodiments, the adjustability of the inclined portion(s) are only available prior to securing the device to the wall and once secured, the inclined portion(s) device becomes non-adjustable. The movable element (e.g., at least one ball) is disposed within a passageway of the conduit and moves freely back and forth along at least a portion of the length of the conduit. Restraints or end stops may be located at the ends or at other areas of the conduit to contain the ball within the conduit. The end stops may have openings that allow fluid (e.g., air, gas, liquid, water vapor, etc.) to flow through the passageway of the conduit from one end to an opposite end.

Systems are available for detecting whether a differential pressure between two spaces (e.g., between a clean room and an adjacent corridor) is above a threshold pressure difference. In some conventional systems, an inclined single conduit passes from one space to another through a wall, and a movable ball is placed in the conduit. On one side of the wall, for example the clean room side, the conduit has a lower region inside of the clean room and a higher region in the corridor. Gravity pulls the ball toward the lower region of the conduit. As the pressure in the clean room is raised higher than the corridor pressure, air pressure and/or air flow apply forces against the ball. Once the pressure difference between the clean room and the corridor reaches a threshold level, the force of the air against the ball overcomes the force of gravity, and the ball moves to a higher region of the conduit. By observing the presence of the ball in the higher region, a user can quickly see that the pressure difference between the two spaces equals or exceeds the desired directional differential pressure threshold level. To change the threshold pressure difference set point, the angle of inclination of the conduit is adjusted such that the amount of gravitational force on the ball in the direction of the conduit is adjusted. That is, in some embodiments, a greater incline of the conduit in which the ball travels requires a greater pressure differential between the two rooms to overcome gravity and move the ball from a lower to a higher region.

According to some embodiments of the present disclosure, a device is provided which provides for ease of installation. For example, in some embodiments, a differential pressure detector is arranged such that once the device is mounted to a barrier (e.g., a wall), an angle of inclination of a conduit portion is not adjustable. Further, the device may include a pitch indicator and/or a roll indicator to aid the installer in confirming the proper angle of inclination. In this manner, if a specific threshold pressure differential set point is desired, a simplified device can be installed with a conduit portion inclined such that the threshold pressure is set to the desired set point. In some embodiments, no further actions are required of the user, and potentially unwanted changes to the set point can be inhibited.

According to some embodiments, the combination of a roll indicator and a pitch indicator with a non-adjustable inclined conduit provides an arrangement which permits the installer and/or user to confirm that the device is set at a desired threshold pressure set point. For example, in such an arrangement, an installer can orient the baseplate until the roll indicator shows that the baseplate is at the desired roll orientation. The pitch indicator then may be used to confirm that the pitch of the inclined conduit is at the desired angle. With the roll at the desired orientation, the pitch indicator is useable to confirm the pitch of the inclined conduit. If the roll indicator were not present, and the roll orientation were not confirmed, the pitch indicator may not work in some embodiments. Or, in some embodiments, the pitch indicator may falsely indicate a correct pitch of the inclined conduit if the roll orientation is not actually at the desired orientation. In this manner, the combination of the roll indicator, pitch indicator, and non-adjustable incline conduit provides a device which may be correctly set to a threshold pressure set point without the need for extra equipment and/or burdensome calibration procedures.

According to some embodiments of the present disclosure, a viewer of the detector is able to check whether the device is calibrated. An out-of-calibration detector may result in the detector indicating a pressure differential which is not actually present, and the actual pressure differential may not meet minimum infection control or contamination standards. Applicant has recognized that it can be advantageous to have the detector arranged such that calibration can be performed using components which form part of the device such that external calibration instruments and/or procedures may be avoided in some embodiments.

Some embodiments of the device may be tamper-resistant in that once the device is installed, the inclination of the conduit portion which houses the movable element cannot be changed. Further, when installing the device in some embodiments, mounting the conduit portion at an incorrect inclination angle may be revealed by the pitch indicator and/or the roll indicator.

According to some embodiments, the above-described feature is provided by arranging a device to have a first conduit portion which is configured to pass through a wall, and a second conduit portion which is angled relative to the first conduit portion. The first and second conduits may be fixed to each other in such a manner (e.g., integrally formed) such that rotation of one portion rotates the other portion. In this manner, if the first portion is fixed to the wall such that the first portion cannot rotate, the inclination of the second portion relative to a horizontal plane remains fixed. For purposes herein, references to a "horizontal plane" refer to a plane which is perpendicular to the direction of the force of gravity. "Vertical plane" refers to a plane which is parallel to the direction of the force of gravity.

According to some embodiments, a conduit portion, within which a movable element travels, is inclined relative to the horizontal plane when the pitch indicator indicates that the device is at a desired pitch. For example, the pitch indicator may be a level, and when the level shows that the level is horizontal, the conduit portion may be inclined relative to the horizontal plane.

When mounting the device to a barrier, a baseplate may be used. If a barrier is not fully vertical, the baseplate may be shimmed or otherwise adjusted to orient the baseplate vertically. According to some embodiments, when the baseplate is oriented vertically, the conduit which holds the movable element is inclined relative to a horizontal plane. For purposes herein, a baseplate may be considered to be oriented vertically when its barrier-contacting surface has an orientation that the baseplate would have if it were to be placed against and secured to a smooth, vertical surface. That is, when referencing a "vertically oriented baseplate", the orientation of the baseplate would be the same as when the baseplate is placed against and secured to a smooth, vertical surface. Referencing a vertically oriented baseplate to explain the inclination or orientation of another component does not require a baseplate to be vertically oriented or to be secured to a vertical barrier.

In some embodiments, a device is provided which can be installed to have a certain threshold pressure differential set point selected from among a discrete number of set points. For example, the device may have a choice of mounting holes in a baseplate such that the device is mountable to a wall at different roll angles. In such a device, once mounted, the device provides a certain threshold set point that is not adjustable without first at least removing the baseplate from the wall.

Turning to the figures, FIGS. 1-4 shows one embodiment of a device 400 configured to be installed in either of two orientations. Device 400 includes a first conduit portion 402 which is configured to pass through at least a portion of a barrier 404. A first end 406 of the first conduit portion 402 is attached to a first conduit support 408, which in this embodiment is a cylinder with an internal diameter that accepts the external diameter of the first conduit portion.

A second conduit portion 410 is attached to a second conduit support 412, which in this embodiment is a cylinder with an internal diameter that accepts the external diameter of the second conduit portion. The first and second conduit supports, 408, 412 are shown as being integrally formed with a baseplate 414, though in other embodiments, one or both of the conduit supports may be separately formed and then attached to the baseplate 414.

Second conduit portion 410 has a longitudinal axis 416 which is angled relative to a longitudinal axis 418 of the first conduit portion 402. With the first conduit portion longitudinal axis 418 being horizontal in the illustrated embodiment, the longitudinal axis 416 of the second portion is inclined relative to a horizontal plane at a same angle as the longitudinal axis 416 is angled relative to longitudinal axis 418. Accordingly, in the orientation shown in FIGS. 1 and 3, to move a ball 420 (or other movable element) upwardly within the second conduit portion, the space on the right hand side of the barrier 404 will need to have a pressure that is higher than the pressure on the left hand side of the barrier. Additionally, to move the ball, the pressure difference between the two spaces will have to provide enough force on the ball to overcome the gravitational force on the ball. In this manner, the weight of the ball, the outer diameter of the ball, the inside diameter of the second conduit, and the incline of the second conduit portion establish a threshold pressure differential. In some embodiments, longitudinal axis 418 is not horizontal relative to gravity, and the longitudinal axis 416 of the second conduit portion has a different angle relative to a horizontal plane than the longitudinal axis 416 has relative to longitudinal axis 418. In the illustrated embodiment, the longitudinal axis 416 of the second conduit portion is transverse to the baseplate and/or the barrier to which the device is mounted. In some embodiments (see, e.g., the embodiments illustrated in FIGS. 9-11), the longitudinal axis 416 of the second conduit portion is parallel to the baseplate and/or the barrier to which the device is mounted.

Two mounting holes 430, 432 are provided on the baseplate 414 to aid in mounting the device to a wall or other barrier. In the illustrated embodiment, the mounting holes are positioned 180° apart from each other and positioned relative to the second conduit such that the second conduit is pitched at the maximum angle relative a horizontal plane when the mounting holes are aligned vertically. Such an arrangement can ease installation by not requiring measurements or calibrations to be performed beyond confirming a suitable roll orientation and confirming that the device is plumb.

The illustrated embodiment may be installed in either of two orientations when the mounting holes are vertically aligned. In this manner, the device may be used to indicate positive pressure when mounted in a first orientation, or to indicate negative pressure when mounted in a second orientation. Other orientations are possible if the mounting holes are rotated to be not vertically aligned. However, installation procedures can be set forth in a straightforward manner to achieve a desired set point by manufacturing a device with second conduit portion which does not change in angle relative to the first conduit portion, and instructing the installer to align the mounting holes vertically using the on-board roll indicator.

In some embodiments, to maintain a constant angle between longitudinal axis 416 of second conduit portion 410 and longitudinal axis 418 of first conduit portion 402, conduit supports 412 and 408 are connected such that the supports are fixed relative to each other from an orientation standpoint. Conduit support 412 cannot be rotated relative to conduit support 408 in the illustrated embodiment. In this manner, once conduit support 412 is fixed to the wall via baseplate 414, the angle of inclination is set and not adjustable without removing the baseplate.

In the illustrated embodiment, longitudinal axis 418 is horizontal, though in some embodiments, longitudinal axis 418 may be non-horizontal. Having longitudinal axis 418 be horizontal helps permit baseplate to be oriented in either of two orientations that are 180° opposite to each other in a manner which allows second conduit portion 410 to have either of two opposite angles (e.g., +5° or −5°, or +15° and −15°).

According to some embodiments, the device includes a first level 434 and a second level 436 which are disposed on the baseplate 414 and are used to assist in mounting the rotatable base to a first side of the barrier to confirm that the second conduit portion is inclined at the correct angle. The second level 436 may be arranged in a direction transverse to the first side 10 of the barrier that abuts the mating surface of the baseplate and may function as a pitch indicator and may be configured to indicate whether the baseplate 414 is aligned with a vertical plane and longitudinal axis 418 is in the horizontal plane. When the baseplate is secured to the barrier, the second level also may indicate whether the barrier is out of plumb and not vertical. If the baseplate is not aligned with a vertical plane in the illustrated embodiment, the angle of inclination of the second conduit portion will not have the correct angle of inclination which establishes the threshold pressure differential set point.

An installer may set the correct threshold pressure set point by ensuring the second level 436 indicates alignment of a rear of the baseplate with a vertical plane. For example, if the wall is not plumb, the baseplate 414 may be shimmed or otherwise adjusted until the second level 436 shows that the device is correctly aligned. In one embodiment, the second level 436 may use an air bubble in liquid to indicate whether the device is oriented correctly, though other arrangements may be used.

In some embodiments, the second level may not need to be mounted to a baseplate surface. Instead, a different surface of the device may have second level 436 mounted thereon, and this different surface may be arranged such that when the surface is horizontal, the second conduit is set at a desired inclination with respect to the horizontal plane.

In some embodiments, the baseplate may not necessarily need to be aligned with a vertical plane to have the second conduit portion set to a correct angle. For example, the baseplate may be arranged to be oriented at an angle relative to a vertical plane, and other portions of the device may play a role in situating the device to a barrier. Second level 436 may still be used to indicate that a certain horizontal surface is horizontal to verify the desired inclination of the second conduit portion. By having a pitch indicator, such as second level 436, attached to the overall device, ease of installation may be facilitated, and the confirmation of pitch may be checked periodically.

The first level 434 is configured to allow an installer to see whether a roll orientation of the baseplate 414 on the barrier is correct, and the first level may be oriented perpendicularly to the second level 436. That is, the first level may function as a roll indicator and indicate when the baseplate is in a correct roll orientation relative to the barrier so that the roll orientation of the second conduit portion is at a desired orientation relative to a vertical plane. By incorporating a roll indicator on the device, ease of installation may be facilitated, and the roll orientation may be confirmed periodically.

A conduit cover 448 may be positioned over a second end 446 of the first conduit portion 402. The conduit cover may include a collar 444 configured to receive the second end of the first conduit portion, and may further include air passageways 442 to allow for the flow of air through the device.

In some cases, devices of exemplary embodiments described herein may include a fire stop system that, upon the detection of a threshold level of smoke or fire, provides a barrier that blocks or otherwise mitigates travel of the smoke/fire from one space or room to another. The fire stop system may include various components used to seal the passage within the wall. For example, the fire stop system may include a fire stop ring 450 located on each side of the barrier. In some embodiments, there may be a single fire stop ring. The fire stop ring may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer. Devices of exemplary embodiments herein may be employed in fire-rated or non-fire-rated applications, as the present disclosure is not so limited.

The second conduit 410 may be transparent so as allowing viewing of the moveable element 420. The second conduit support portion support 412 may be constructed with an opaque material so that the ball is not visible from the side of the device. In this manner, the presence or absence of the ball can be readily noticed to understand whether the threshold pressure differential is being met. The ball may be at least partially hidden or hidden by the support 412 from a side view of the conduit 410 and support 412.

By hiding or at least partially hiding the ball in the second conduit portion support (e.g. a collar), it is not necessary for the ball to enter the wall or pass through the wall for the ball to be hidden. Accordingly, the first conduit portion may have a smaller diameter than the ball, which may reduce the size of the penetration that is made through the wall to install the device. For example, the ball may have a diameter of 1.5 inches, and the second conduit portion may have an inside diameter slightly larger than the ball. The first conduit portion may have an inner diameter of one inch, or half an inch, or any other suitable inner diameter that is smaller than the diameter of the ball.

Figure 5:
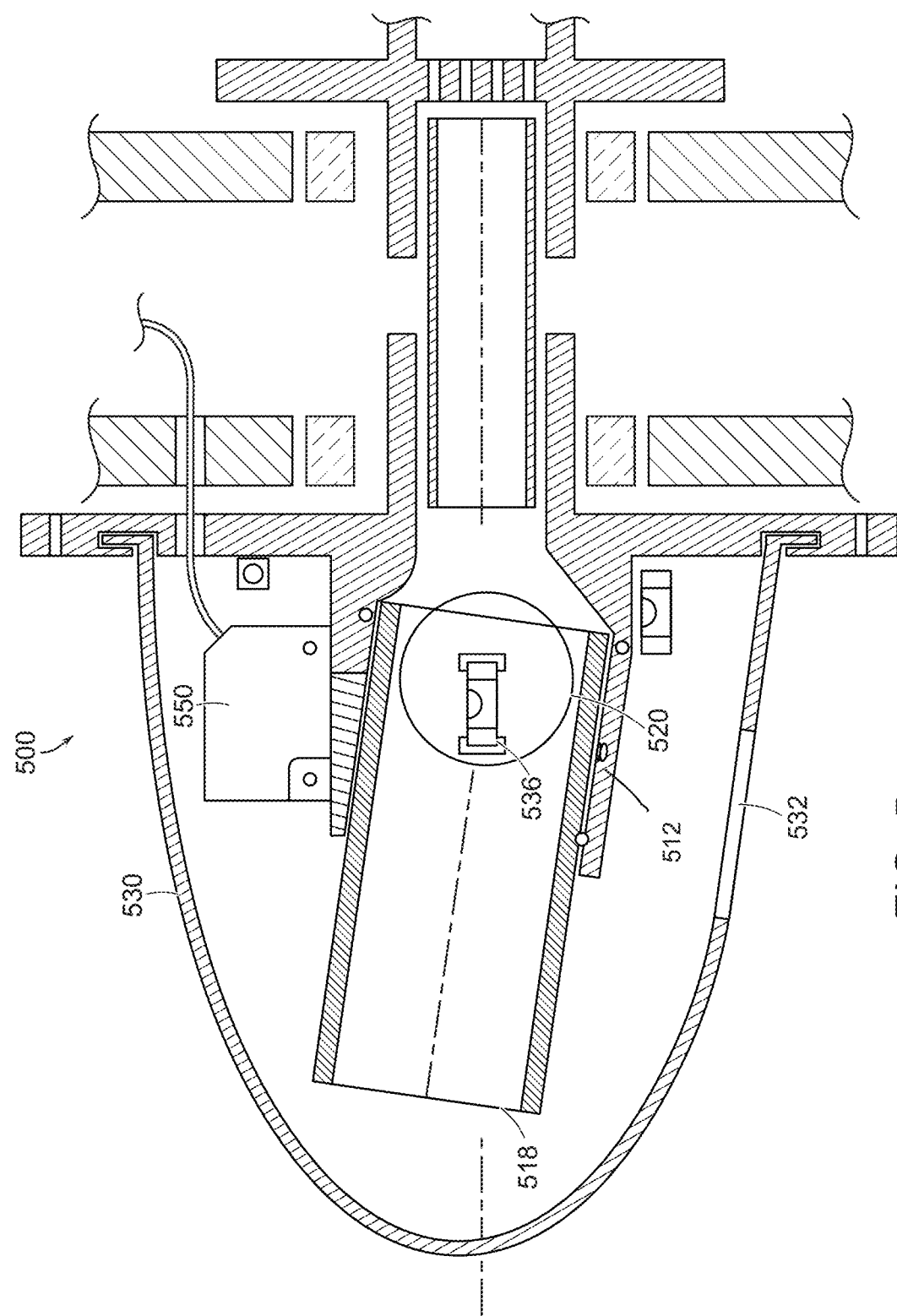
FIG. 5 is a cross-section side view of an alternative embodiment.

The embodiment illustrated in FIG. 5 includes device 500 which is similar to device 400 shown in FIGS. 1-4. A pitch level 536 is shown in an alternative position as compared to the embodiments of FIGS. 1-4. In this embodiment, the pitch level 536 is mounted on a side of a conduit support 512.

Any suitable device may be used as a pitch indicator. For example, a device which responds to the force of gravity (e.g., bubble inclinometer, pendulum inclinometer, bubble level, etc.) may be mounted to an appropriate portion of the baseplate or other component so that an accurate determination can be made as to whether the pitch of the second conduit is at a desired pitch angle relative to the horizontal plane, or in some embodiments to see what the actual pitch inclination is.

A detector such as a photoelectric sensor 550 may be employed to detect the presence and/or absence of the movable element, such as a ball 520. In the illustrated embodiment, when the ball returns to a lower vertical region, as shown in FIG. 5, thereby indicating the differential pressure that is below the threshold differential pressure, photoelectric sensor 550 detects the presence of the ball and sends a signal. The detector may transmit the signal to trigger an alarm or annunciator to alert someone that the differential pressure is below the threshold. In some systems, the detector may transmit a signal to a controller such as an HVAC controller or a building services controller.

As shown in FIG. 5, the device 500 also includes a transparent shield 530 which may be used to protect the second conduit portion and other components from unintentional contact while allowing the movable element to remain visible so that a directional differential pressure may be indicated. The shield includes an orifice 532 which allows air to pass from the first side of the barrier to the second conduit portion through an end stop 518. Accordingly, the shield does not interfere with the differential pressure based movement of a movable element in the second conduit portion. It should be noted that the shield may be omitted from the device 500 without a corresponding loss in functionality of the movable element disposed therein.

The embodiments shown in FIGS. 1-5 allow an installer to adjust the length of the device to conform to the thickness of the wall or other barrier when installing the device to a wall or other barrier. For example, the first conduit portion 402 may be cut to size and then inserted into first conduit support 408 and collar 444 of the rear cover so that the device fits in a particular barrier.

Figure 6:
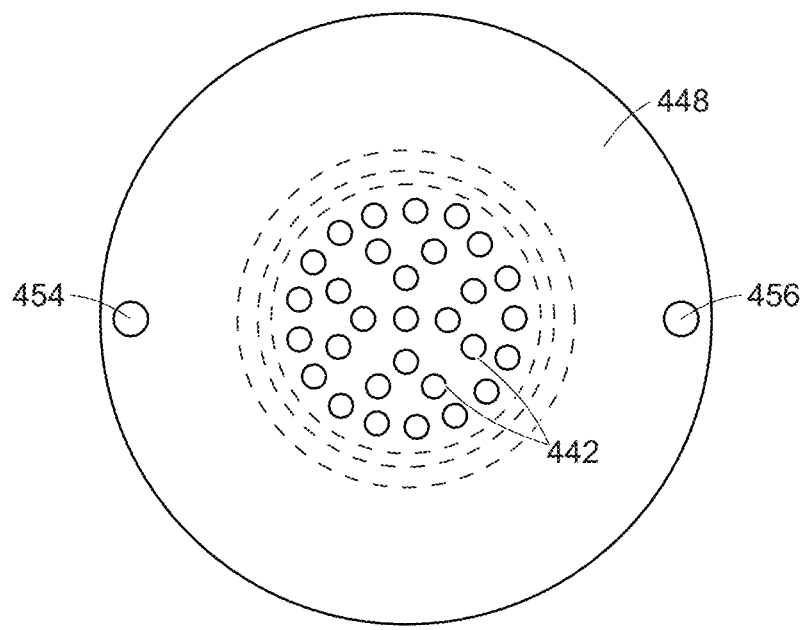
FIG. 6 is a rear view of the embodiment of FIG. 1.

FIG. 6 shows conduit cover 448 from a viewpoint toward the outside of the barrier to which the conduit cover is attached. The conduit cover includes their passageways 442, which may be sized and shaped in any suitable configuration. Mount holes 454, 456 may be included.

Figure 7:
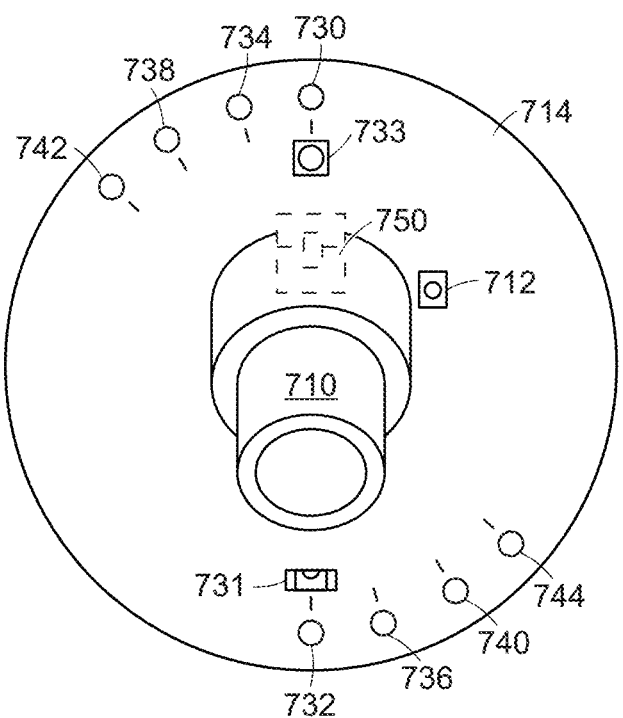
FIG. 7 is a front view of an alternative embodiment.

FIG. 7 shows an embodiment where a baseplate 714 is mountable in any one of four discrete roll orientations. A second conduit portion 710 remains fixed in its inclination once the baseplate 714 is secured to the wall. In this manner, different inclinations of the second conduit portion 710 are available to the installer. Accordingly, four different threshold pressure differentials are achievable with this single device. In the orientation illustrated in FIG. 7, the maximum downward inclination achievable with this particular embodiment is shown. Rotating the baseplate 714 clockwise to vertically align mounting holes 734 and 736 will rotate second conduit portion 710 clockwise and thereby decrease the downward angle of the second conduit portion. In this embodiment, the second conduit portion is not rotatable relative to the baseplate. As such, the threshold pressure is not adjustable unless the baseplate is uninstalled, repositioned, and reinstalled.

A roll level 731 may be used to confirm that mounting holes 730, 732 are vertically aligned and confirm that the second conduit 710 is in a desired roll orientation relative to a vertical plane. Additional roll levels may be mounted on the baseplate adjacent to mounting holes 736, 740, and 744 so that vertical alignment of those mounting holes may be confirmed when the device is installed in the different roll orientations. Markings indicating threshold pressure differentials associated with each orientation may be included directly on the baseplate. A pitch level 733 may be mounted to the baseplate and/or to a conduit support 712 to calibrate the inclination angle of the second conduit 410 to a horizontal plane. A photoelectric detector 750 may be included to detect the presence and/or absence of a ball or other movable element within the second conduit portion.

Mounting holes 730, 734, 738, and 742 may all have a same radial distance from the center of the baseplate. Mounting holes 732, 736, 740, and 744 may all have a same radial distance from the center of the baseplate. Though the radial distance of mounting holes 732, 736, 740, and 744 may differ from the radial distance of mounting holes 730, 734, 738, and 742.

Other types of mounting components may be used as baseplate mounting components and/or barrier mounting components. For example, the baseplate may have resilient plugs which can be pushed into receptors adhered to the barrier.

Figure 8:
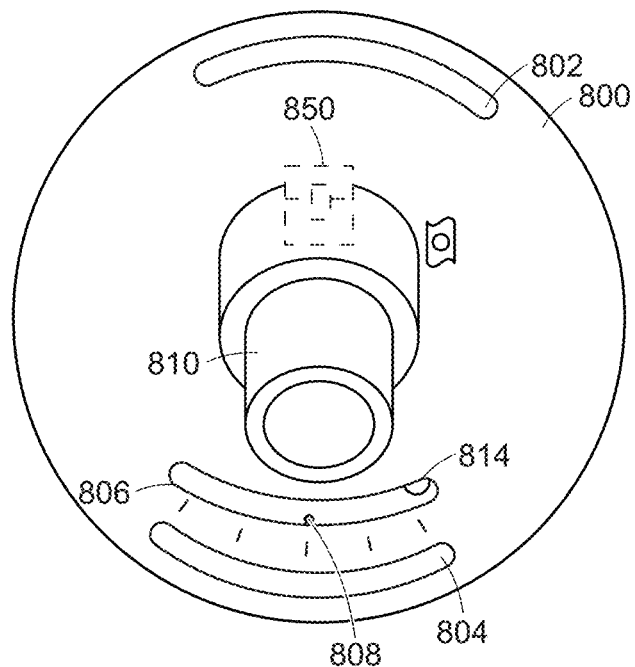
FIG. 8 is a front view of an alternative embodiment.

FIG. 8 illustrates an alternative embodiment of a baseplate 800 in which instead of mounting holes, mounting slots 802, 804 are provided. In this manner the orientation of the baseplate continuously varied across a given range.

As with other embodiments disclosed herein, the roll orientation of the second conduit portion relative to the baseplate may be fixed. A vial 806 with a ball 808, or a gas bubble 814 or other pointer may be included on the baseplate to function as a roll indicator and may indicate the threshold pressure differential set point associated with the installed roll orientation of the baseplate. In FIG. 8, the weighted ball would be used as the indicator. When the device is rotated 180 degrees to indicate an opposite directional differential pressure threshold, the bubble in the vial may be used as the indicator. For example, threshold pressure differential values may be marked along the length of vial 806. Other suitable markings may be used in other embodiments. Any suitable device may be used to indicate the roll orientation and/or threshold pressure differential set point. For example, a device which responds to the force of gravity (e.g., bubble inclinometer, pendulum inclinometer, bubble level, etc.) may be mounted to an appropriate portion of the baseplate so that an accurate determination can be made as to the actual degree of roll of the baseplate.

A photoelectric detector 850 or other detector may be used to sense the presence and/or absence of a movable element within a second conduit portion 810.

Figure 9:
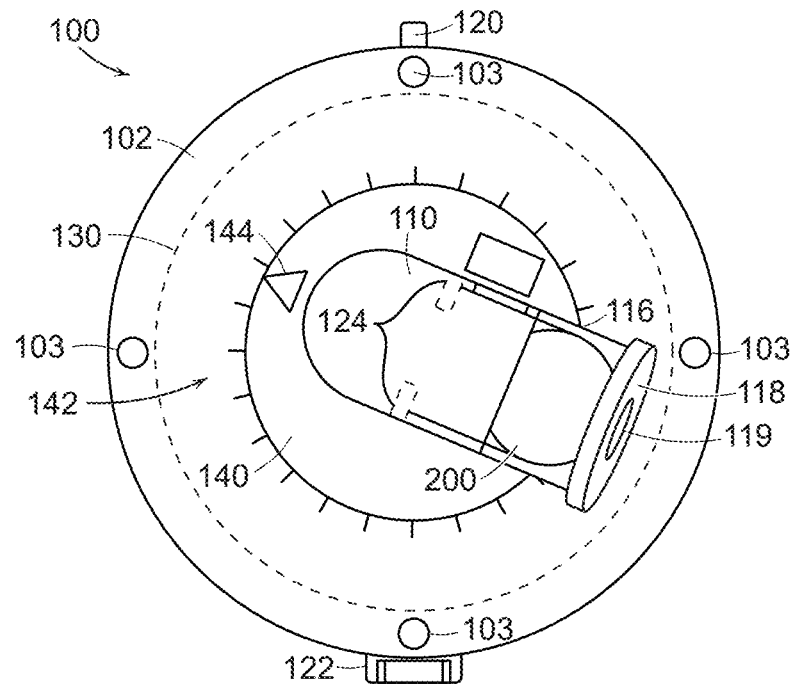
FIG. 9 is a front view of another alternative embodiment.

FIG. 9 is a front schematic view of another embodiment of a device 100 for indicating a directional differential pressure. The embodiment of FIG. 9 is configured to indicate a threshold differential pressure threshold set point based on the angle of inclination of a pivot arm 116 relative to a horizontal plane. That is, in the depicted embodiment, the pivot arm 110 includes a rotatable baseplate 140 which rotates concurrently with the pivot arm. The rotatable baseplate includes an arrow 144 which is aligned with an end of the pivot arm which is inclined as the pivot arm rotates.

Pluralities of markings are disposed on a baseplate 102 which is fixed to the wall. The markings are disposed around a circumference of the rotatable base in a predetermined interval and denote various angles of the pivot arm. The markings may correspond to threshold differential pressure values from a separate chart or may list threshold differential pressure values. Thus, during installation of the device, the pivot arm may be rotated to a position so that an appropriate differential pressure threshold may be set for a given space. The accuracy of the markings 142 may be affected by the alignment of the pivot arm axis of rotation with a horizontal plane, which may be indicated with a first level 120. Additionally, the accuracy may also be partly determined by the roll orientation of the rotatable base 102, the correct orientation of which is indicated by a second level 122. Together, the pitch indicator 120 and the roll indicator 122 may be used to calibrate the correct orientation of the device so the markings and pointer are calibrated. A photoelectric detector 950 and/or other detector may be employed to detect the presence and/or absence of a ball 200 within pivot arm 116. Mounting holes 103 may be provided at any suitable locations to mount baseplate 102 to the wall.

Figure 10:
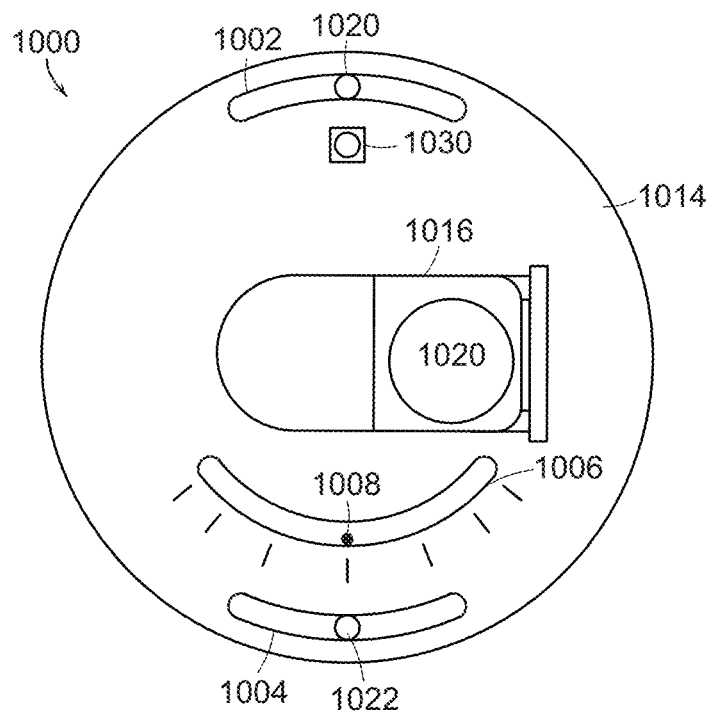
FIG. 10 is a front view of another embodiment.

FIG. 10 illustrates an embodiment which has similarities to FIG. 8 where a device 1000 includes a second conduit portion 1016 which is rotationally fixed to a baseplate 1014, and unlike FIG. 8 where the second conduit 810 is transverse to the baseplate, the second conduit 1016 in FIG. 10 is parallel to the baseplate. In this manner, the inclination of the second conduit portion 1016 is not adjustable relative to the baseplate. The inclination of the second conduit portion can be changed by loosening mounting fasteners 1020, 1022, rotating mounting slots 1002, 1004 about the fasteners, and tightening mounting fasteners 1002, 1004.

A curved vial 1006 with a weighted ball 1008 or other suitable pointer may be used indicate the roll angle and/or the threshold pressure differential set point brought about by the roll angle of the baseplate. The vial may include a liquid and a gas bubble. A pitch level 1030 may be included to help installation of the device such that the baseplate 1014 is vertically aligned. Together, the pitch indicator 1030 and the roll indicator 1006 are used to calibrate the correct orientation of the device so that the inclination angle of the second conduit 1016 is calibrated.

Figure 11:
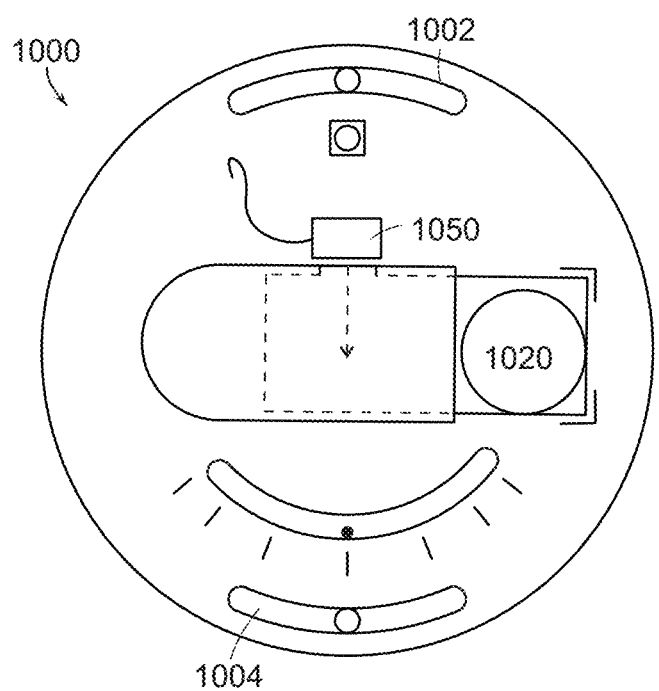
FIG. 11 shows the embodiment of FIG. 10 with a photoelectric detector attached to the device.

FIG. 11 shows an embodiment similar to the embodiment of FIG. 10, and additionally includes a photoelectric sensor 1050 or other sensor to sense the presence and/or absence of a ball 1020.

Figure 12:
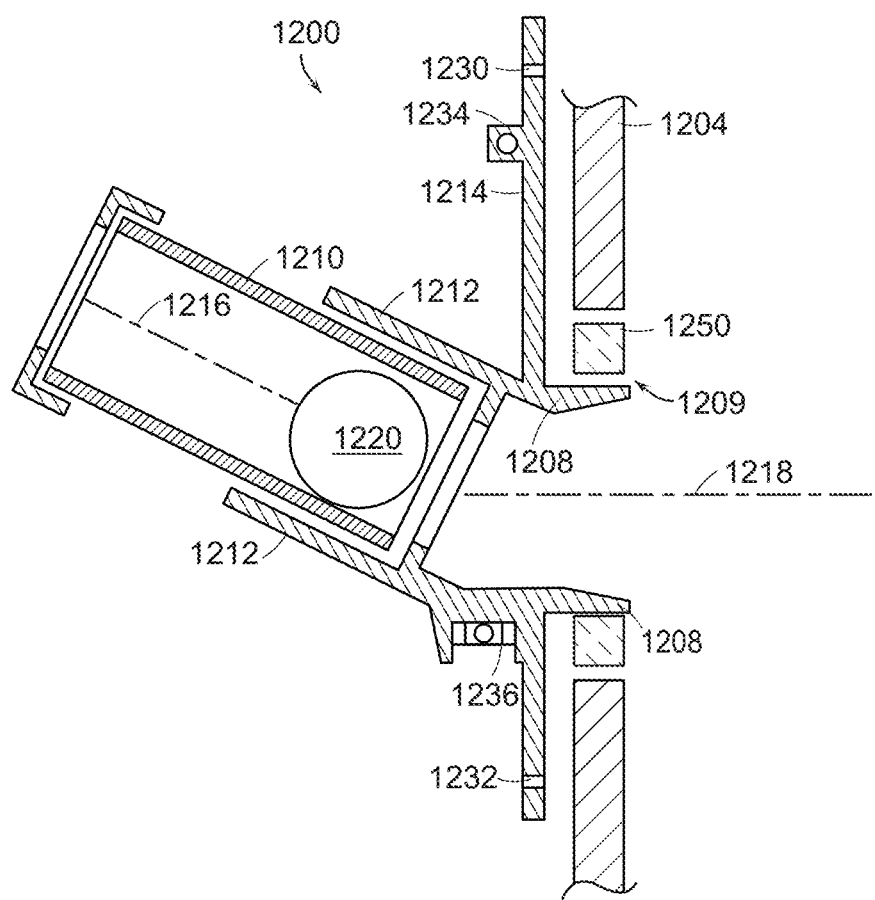
FIG. 12 is a cross-sectional side view of an alternative embodiment of a device for indicating a directional differential pressure.

FIG. 12 shows one embodiment of a device 1200 configured to be installed in either of two orientations. Device 1200 includes a first conduit portion 1208 which is configured to pass through at least a portion of a barrier 1204. Notably, the barrier 1204 may be a single solid piece of material, such as a glass pane. That is, the first conduit portion 1208 may provide fluid communication between two spaces separated by the barrier 1204, where the barrier does not include any air gap or internal space.

As shown in FIG. 12, a second conduit portion 1210 is attached to a second conduit support 1212, which in this embodiment is a cylinder with an internal diameter that accepts the external diameter of the second conduit portion. The first conduit portion 1208 and the second conduit support 1212 are shown as being integrally formed with a baseplate 1214, though in other embodiments, one or both of the conduit supports and the first conduit portion may be separately formed and then attached to the baseplate 1214. Conduit support 1212 is transverse but not perpendicular to the baseplate and/or barrier in some embodiments. That is, in some embodiments, the conduit support has a longitudinal axis which is angled toward the baseplate or the barrier at an angle which is not ninety degrees.

According to the embodiment of FIG. 12, the second conduit portion 1210 has a longitudinal axis 1216 which is angled relative to a longitudinal axis 1218 of the first conduit portion 1208. With the first conduit portion longitudinal axis 1218 being horizontal in the illustrated embodiment, the longitudinal axis 1216 of the second portion is inclined relative to a horizontal plane. Accordingly, in the orientation shown in FIG. 12, to move a ball 1220 (or other movable element) upwardly within the second conduit portion, the space on the right hand side of the barrier 1204 will need to have a pressure that is higher than the pressure on the left hand side of the barrier. Additionally, to move the ball, the pressure difference between the two spaces will have to provide enough force on the ball to overcome the gravitational force on the ball. In this manner, the weight of the ball, the outer diameter of the ball, the inside diameter of conduit portion 1210 and the incline of the second conduit portion establish a threshold pressure differential.

According to the embodiment of FIG. 12 and similar to the embodiment of FIGS. 1-4, the device 1200 includes two mounting holes 1230, 1232 provided on the baseplate 1214 to aid in mounting the device to a wall or other barrier. In the illustrated embodiment, the mounting holes are positioned 180° apart from each other and positioned relative to the second conduit such that the second conduit is pitched at the maximum angle relative a horizontal plane when the mounting holes are aligned vertically. Such an arrangement can ease installation by not requiring measurements or calibrations to be performed beyond confirming a suitable roll orientation and confirming that the device is plumb (e.g., with a pitch indicator.)

The illustrated embodiment may be installed in either of two orientations when the mounting holes are vertically aligned. In this manner, the device may be used to indicate positive pressure when mounted in a first orientation, or to indicate negative pressure when mounted in a second orientation. Other orientations are possible if the mounting holes are rotated to be not vertically aligned. However, installation procedures can be set forth in a straightforward manner to achieve a desired set point by manufacturing a device with second conduit portion which does not change in angle relative to the first conduit portion, and instructing the installer to align the mounting holes using the on-board roll indicator.

In some embodiments, to maintain a constant angle between longitudinal axis 1216 of second conduit portion 1210 and longitudinal axis 1218 of first conduit portion 1208, the first conduit portion and second conduit portion are connected such that the supports are fixed relative to each other from an orientation standpoint. Conduit support 1212 cannot be rotated relative to the first conduit portion 1208 in the illustrated embodiment. In this manner, once conduit support 1212 is fixed to the wall via baseplate 1214, the angle of inclination is set and not adjustable without removing the baseplate. Such an arrangement may provide a tamper-resistant device to provide a set pressure differential threshold. In some embodiments, tamper-resistant screws may be used to fasten the baseplate to the barrier, further inhibiting intentional or unintentional changes to the device.

In the illustrated embodiment, longitudinal axis 1218 is horizontal, though in some embodiments, longitudinal axis 1218 may be non-horizontal. Having longitudinal axis 1218 be horizontal helps permit baseplate to be oriented in either of two orientations that are 180° opposite to each other in a manner which allows second conduit portion 1210 to have either of two opposite angles (e.g., +5° or −5°, or +15° and −15°).

According to some embodiments as shown in FIG. 12, the device includes a first level 1234 and a second level 1236 which are disposed on the baseplate 1214 and are used to assist in mounting the rotatable base to a first side of the barrier to confirm that the second conduit portion is inclined at the correct angle. The first level 1234 may act as a roll indicator in some embodiments, and the second level 1236 may act as a pitch indicator in some embodiments. The second level 1236 is arranged in a direction transverse to the first side of the barrier and is configured to indicate whether the baseplate 1214 is aligned with a vertical plane and longitudinal axis 1208 is in the horizontal plane. When the baseplate is secured to the barrier, the second level also may indicate whether the barrier is out of plumb and not vertical, thereby indicating whether longitudinal axis 1216 of second conduit 1210 is referencing a horizontal plane. If the baseplate is not aligned with a vertical plane in the illustrated embodiment, the angle of inclination of the second conduit portion will not have the correct angle of inclination which establishes the threshold pressure differential set point. An installer may set the correct threshold pressure set point by ensuring the second level 1236 indicates alignment of a rear of the baseplate with a vertical plane. For example, if the wall is not plumb, the baseplate 1214 may be shimmed or otherwise adjusted until the second level 1236 shows that the device is correctly aligned. In one embodiment, the second level 1236 may use an air bubble in liquid to indicate whether the device is oriented correctly, though other arrangements may be used.

According to the embodiment of FIG. 12, the first level 1234 is configured to allow an installer to see whether a roll orientation of the baseplate 1214 on the barrier is correct, and therefore the first level is oriented perpendicularly to the second level 1236. That is, the first level indicates when the baseplate is in a correct roll orientation relative to the barrier so that the roll orientation of the second conduit portion is correct relative to a vertical plane. Together, the pitch indicator 1236 and the roll indicator 1234 are used to calibrate the correct orientation of the device so that the inclination angle of the second conduit 1016 is calibrated.

According to the embodiment of FIG. 12, the device 1200 may include a fire stop system that, upon the detection of a threshold level of smoke or fire, provides a barrier that blocks or otherwise mitigates travel of the smoke/fire from one space or room to another. The fire stop system may include various components used to seal the passage within the wall. For example, as shown in FIG. 12, the fire stop system may include a single fire stop ring 1250 located on the barrier 1204. The fire stop ring may include an intumescent substance that swells significantly as a result of heat exposure. The fire stop materials may be appropriately installed, for example, employing intumescent material as known to those of ordinary skill in the art. In some cases, the intumescent substance may produce char, which is a substance that acts to retard heat transfer. Devices of exemplary embodiments herein may be employed in fire-rated or non-fire-rated applications, as the present disclosure is not so limited.

According to the embodiment of FIG. 12, the second conduit 1210 is transparent so as to be able to see the moveable element 1220. The support 1212 may be constructed with an opaque material so that the ball is not visible from the side of the device. In this manner, the presence or absence of the ball can be readily noticed to understand whether the threshold pressure differential is being met. By hiding or at least partially hiding the ball in the second conduit portion support (e.g. a collar), it is not necessary for the ball to pass through the barrier 1204 for the ball to be hidden. Accordingly, the first conduit portion 1208 may have a smaller diameter than the ball, which may reduce the size of the penetration that is made through the wall to install the device. For example, the ball may have a diameter of 1.5 inches, and the second conduit portion may have an inside diameter slightly larger than the ball. The first conduit portion 1208 may have an inner diameter of one inch, or half an inch, or any other suitable inner diameter that is smaller than the diameter of the ball.

In some embodiments, a device may not extend into a barrier or wall to which it is attached. For example, in some embodiments the device may be positioned only on a single side of the barrier. According to some embodiments, a device may only include an inclined conduit, where the inclined conduit does not penetrate the barrier. That is, the device may be attached to a single side of the wall (e.g., with fasteners such as mechanical fasteners or adhesives) without any portion of the device protruding into or through the barrier. In such an embodiment, the opening 1209 in the wall or barrier may form a conduit portion which is in fluid connection with conduit portion 1210. Of course, in other embodiments a device may fully or partially penetrate a barrier, as the present disclosure is not so limited.

Figure 13:
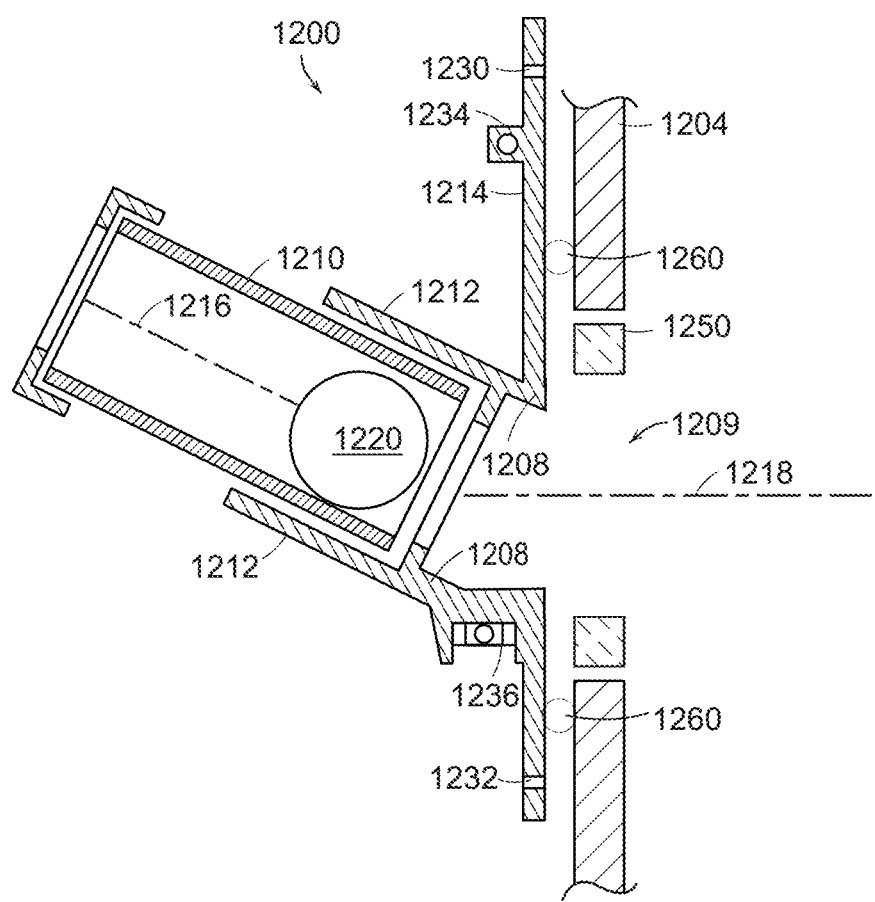
FIG. 13 is a cross-sectional side view of an alternative embodiment of a device for indicating a directional differential pressure.

FIG. 13 depicts an alternative embodiment of a device 1200 for indicating a directional difference pressure similar to the embodiment of FIG. 12. In particular, the device 1200 includes a first conduit portion 1208 which is configured to not penetrate or pass through a barrier 1204. Notably, the barrier 1204 may be a single solid piece of material, such as a glass pane. That is, the first conduit portion 1208 may provide fluid communication between two spaces separated by the barrier 1204, where the barrier does not include any air gap or internal space. Like the embodiment of FIG. 12, a second conduit portion 1210 is attached to a second conduit support 1212, which in this embodiment is a cylinder with an internal diameter that accepts the external diameter of the second conduit portion. The first conduit portion and second conduit support, 1208, 1212 are shown as being integrally formed with a baseplate 1214, though in other embodiments, one or both of the first conduit portion and the second conduit support may be separately formed and then attached to the baseplate 1214.

According to the embodiment of FIG. 13 and like the embodiment of FIG. 12, the second conduit portion 1210 has a longitudinal axis 1216 which is angled relative to a longitudinal axis 1218 of the first conduit 1208. With the first conduit portion longitudinal axis 1218 being horizontal in the illustrated embodiment, the longitudinal axis 1216 of the second portion is inclined relative to a horizontal plane. Accordingly, in the orientation shown in FIG. 13, to move a ball 1220 (or other movable element) upwardly within the second conduit portion, the space on the right hand side of the barrier 1204 will need to have a pressure that is higher than the pressure on the left hand side of the barrier. Additionally, to move the ball, the pressure difference between the two spaces will have to provide enough force on the ball to overcome the gravitational force on the ball. In this manner, the weight of the ball and the incline of the second conduit portion establish a threshold pressure differential.

According to the embodiment of FIG. 13 and in contrast to the embodiment of FIG. 12, the device 1200 is configured to not penetrate the barrier 1204. That is, the baseplate 1214 is secured to one side of the barrier 1204, and no portion of the device 1200 protrudes into an opening 1209 formed in the barrier 1204. In this manner, the opening 1209 may function as a conduit connecting the device 1200 to a space on the opposite side of the barrier 1204. As shown in FIG. 13, the device 1200 may include a seal 1260, which may be an O-ring or another suitable fluid barrier. The seal may ensure that fluid (e.g., air) does not flow from one space to the other between the baseplate 1214 and barrier 1204. This embodiment may have a pitch indicator 1236 and a roll indicator 1234 which together are used to reach the correct orientation of the device so the inclination angle of the second conduit 1016 is calibrated.

Figure 14:
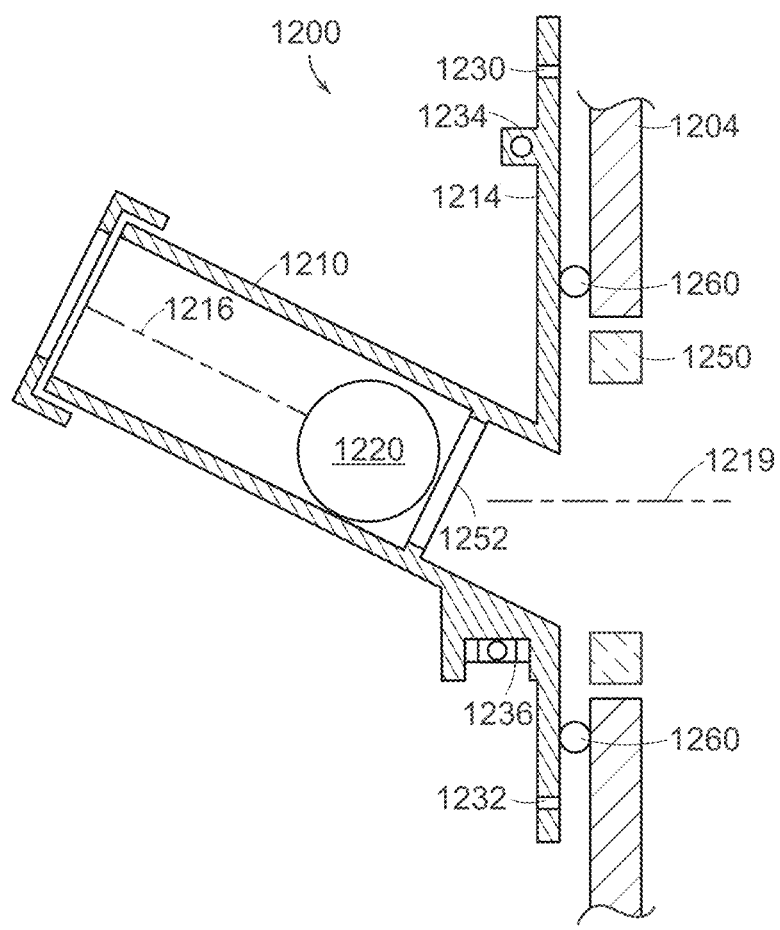
FIG. 14 is a cross-sectional side view of an alternative embodiment of a device for indicating a directional differential pressure.

FIG. 14 shows an embodiment similar to the embodiment of FIG. 13, but second conduit portion 1210 is not inclined relative to the conduit portion which is located beyond a ball stop 1252. In the illustrated embodiment, second conduit portion 1210 is inclined relative to the horizontal plane 1219 when baseplate 1214 is oriented vertically and the pitch indicator 1236 indicates a horizontal plane. The roll indicator 1234 is used to indicate the roll orientation of the second conduit 1210 relative to a vertical plane. Together, the pitch indicator 1236 and the roll indicator 1234 are used to reach the correct orientation of the device so the inclination angle of the second conduit 120 is calibrated.

Figure 15:
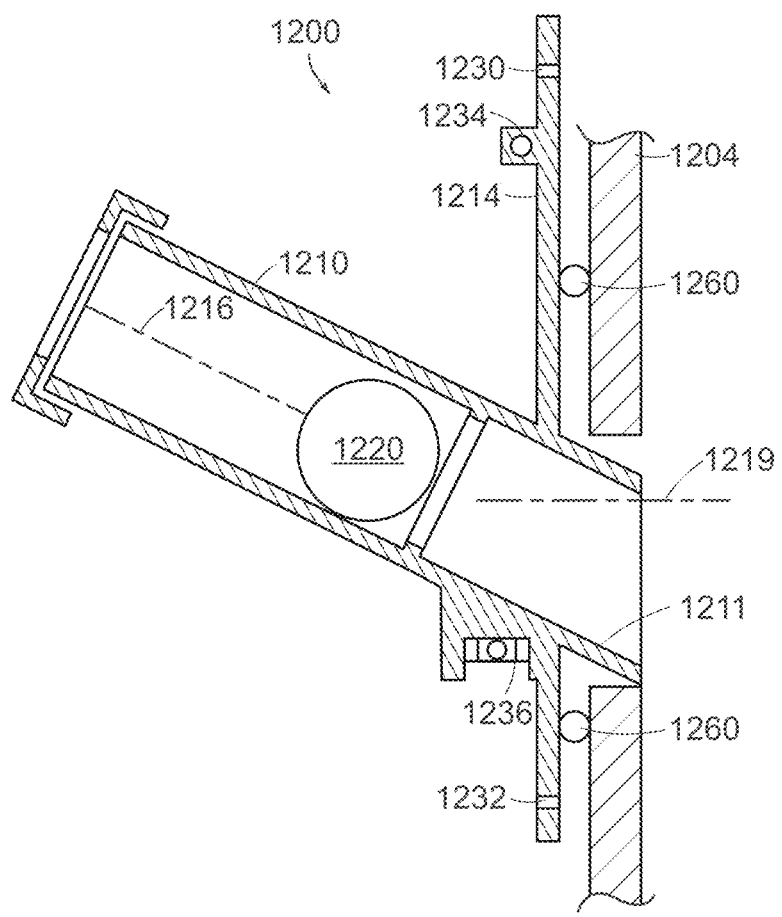
FIG. 15 is a cross-sectional side view of an alternative embodiment of a device for indicating a directional differential pressure.

FIG. 15 shows an embodiment similar to the embodiment of FIG. 14, but with first conduit portion 1211 protruding into barrier 1204.

Figure 16:
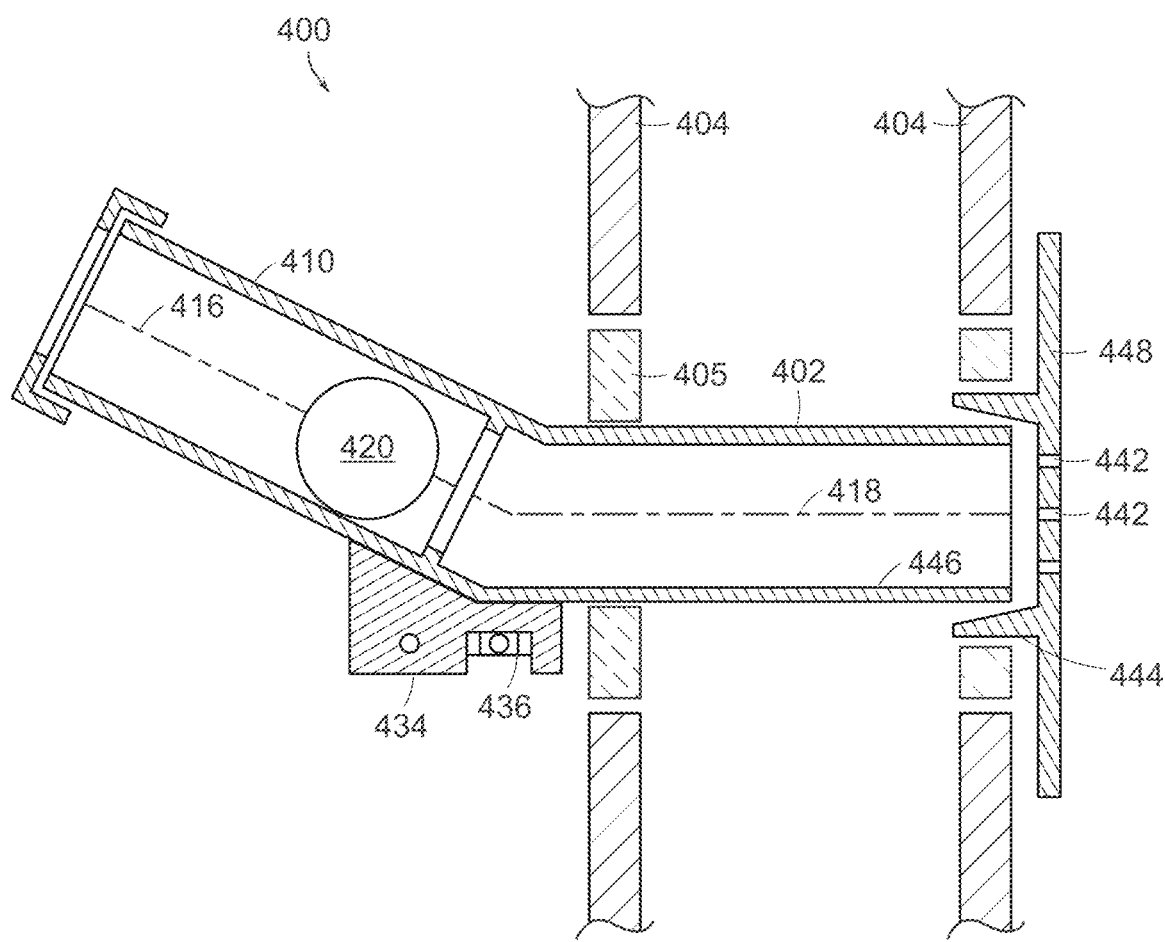
FIG. 16 is a cross-sectional side view of an alternative embodiment of a device for indicating a directional differential pressure.

FIG. 16 shows an embodiment where first conduit portion 402 is attached to barrier 404 with a collar 405. In some embodiments, a roll indicator, such as level 434, is mounted directly to the conduit and/or mounted directly to the pitch level 436. Together, the pitch indicator and the roll indicator are used to reach the correct orientation of the device so the inclination angle of the second conduit 410 is calibrated. Second conduit portion 410 may be integrally formed with first conduit portion 402. For the various components described herein as being integrally formed with one another, any suitable manner of forming the integral piece may be used. For example, injection molding, casting, or any other suitable manufacturing technique may be used. In some embodiments, two or more components may be permanently and non-adjustably connected to one another through welding or other suitable technique such that the pieces cannot be removed from one other without damaging one or both of the pieces.

Various embodiments disclosed herein may include a threshold directional differential pressure set point indicator mounted to the baseplate—the threshold directional pressure difference being the difference which is sufficient to cause the movable element to move from a lower region of the inclined conduit to a higher region. The directional differential pressure set point indicator may include, for example, a bubble vial, a rotating weighted pendulum pointer, or any other suitable component that responds to the incline of the conduit. In the descriptions presented above, the pitch and the roll indicators, used together, provide a calibration to allow the device to be installed to a desired pitch and roll orientations of the inclined conduit containing the moveable element, such that the desired orientation corresponds to the desired directional differential pressure setpoint between the two separate spaces.

The pressure difference required to move the ball from a home position (the ball's position when there is no pressure difference between the rooms) can vary based at least on the physical features of the conduit (e.g., passageway diameter, straightness/curvature, surface finish), physical features of the ball (e.g., diameter, weight, surface finish), degree of incline of the conduit, fluid properties of the media between compartments, and the orifice sizes at the end stops. In many cases, each of the above parameters is known to a sufficient degree such that threshold directional pressure differences can be linked to the angle of inclination of the conduit portion within which the movable element travels. In some embodiments, balls of different weights may be used to adjust the threshold pressure differences. In such embodiments, the conduit angle may or may not be adjustable.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room's ventilation system exhausts more air than is supplied within it to an extent that the negative pressure is of a greater magnitude than any adjacent space. Thus, the device may be installed in the corridor, outside of the isolation room. The inclined conduit is installed with a downward orientation such that the end of the conduit that is closer to the wall toward the isolation room is at a higher position than the opposite end of the conduit that is away from the wall in the corridor.

When the net directional differential pressure between the isolation room and the outside space is zero (e.g., a door between the room and the outside space is opened), or the pressure in the isolation room is greater than the adjacent spaces, the ball will fall to the lower end of the conduit such that an observer in the corridor would see the ball at the bottom of the lower end, farthest away from the wall. When the appropriate degree of negative pressure is applied to the room to overcome gravity and the device characteristics, the ball moves upwardly within the conduit toward the wall to the vertically higher end of the inclined conduit. That is, the difference between the pressure of the isolation room and the pressure in the corridor outside on the opposite side of the wall causes forces on the ball that are sufficient to move the ball upwardly, thereby indicating that at least the appropriate direction of air flow through an opening between the rooms and degree of negative pressure is applied to the isolation room to prevent the escape of infectious pathogen air in the isolation room. It should be noted that Applicant has appreciated that the communicating conduit can not only be through one wall or barrier and sense the pressure conditions on each side, but, in some embodiments, the conduit may leave a room and pass through adjacent spaces and open up to a space not immediately adjacent to the initial room.

In the case of a hospital operating room that is required to exhibit a positive pressure, so as to substantially prevent potentially contaminated air from flowing into the room from a surrounding space, the device may be installed in the corridor outside of the operating room such that the end of the conduit that extends toward the operating room is at a lower position than the opposite end of the conduit that extends away from the operating room and into the corridor. Thus, when a suitable amount of positive pressure is applied to the operating room, there is sufficient directional differential pressure to move the ball upwardly, farthest away from the wall to the higher end of the conduit.

The inclined conduit containing the ball may be clear to allow visibility of the position of the ball. The conduit may be of a length that is twice as long as the diameter of the ball in some embodiments. The conduit may have an opaque cover at the half-end of the conduit closest to the wall the device is mounted to on one side of the wall. When the ball travels to a position closest to the wall, the ball may be hidden when the device is viewed from the side. This feature facilitates a view of the position of the ball.

When installed, the conduit may be oriented at an appropriate angle of inclination that corresponds to the desired threshold differential pressure set point. In some embodiments, the desired differential pressure set point may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column manometer. It will be appreciated that devices of the present disclosure may provide an indication of other differential pressures between adjacent spaces outside of these ranges.

Physical features other than the incline of the conduit may provide an indication of whether the directional differential pressure between spaces meets a certain threshold. For instance, the type of ball placed within the conduit may be chosen based on particular characteristics, such as weight or surface finish of the ball. For example, a greater differential pressure will be required to move a heavier ball from a lower region of the conduit to a higher region of the conduit. Conversely, if the ball is lighter, a smaller differential pressure will be required to move the ball toward the higher end of the conduit. Alternatively, a ball having a rough surface finish may require a greater degree of air flow provided through differential pressure to move the ball toward the higher end of the conduit. Accordingly, different balls, or movable elements, may be marked according to the range of differential pressure that the detector, incorporating the particular ball(s), may indicate. For example, two or more movable elements having different weights may be provided, each with a different color and/or markings. The markings may indicate what threshold differential pressure set point is set when the particular movable element (e.g., ball) is used in the conduit. When the device is configured to permit only one inclination, the movable element may have a pressure marking directly on the movable element. A user may select which movable element (e.g., ball) to place in the device from among a plurality of movable elements of different weights. Or the user may select which movable element (e.g., ball) to place in the device from among a plurality of movable elements having different diameters. In this manner, a second ball may be swapped for a first ball by removing the first ball from the conduit and inserting the second ball into the conduit. Other parameters may include the diameter of a ball and the inside diameter of the inclined conduit containing the ball.

In some embodiments, an end stop that forms a suitable fit (e.g., interference fit, snap fit) over an end of a conduit may include a sound attenuator. In some cases, a movable element may be a plastic ball (e.g., a ping pong ball) and the end stop may be made of a hard plastic. Thus, without inclusion of the sound attenuator between the conduit and the end stop, when the ball impacts against the end stop, an abrupt sound may be produced which can be easily heard by a person located in the space where the impact occurs, and possibly in an adjacent space where the other open end of the conduit resides. When the sound attenuator is placed between the conduit and the end stop, impact of the ball against the sound attenuator will produce a much softer sound which is not as readily noticeable as compared with the sound produced when the energy-absorbing material is not present. The sound attenuator may be formed in a separate layer on the end stop, or may be integrated into the end stop (e.g., the end stop may exhibit a geometry similar to a diaphragm), as the present disclosure is not so limited.

In some embodiments, there may not be an alignment of the travel path of the center of the ball and an opening at the end of the conduit. For example, an interior-facing portion of an opening at the end of the conduit may be arranged and positioned such that the movable element substantially prevents air flow when the movable element abuts the interior-facing portion of the opening, yet a center axis of the opening (e.g., the centroid of the area of the opening) is not aligned with a travel path of a center of the movable element. A ramp may be present toward the end of the conduit such that the movable element is pushed up into the opening.

Screws may be used to mount a baseplate to a wall, though other suitable fasteners may be used. It should be noted that while screws are shown in exemplary embodiments described herein, any suitable arrangement may be employed to join various components.

The conduit(s) of exemplary embodiments described herein may include any suitable material. In some embodiments, the conduit(s) may be made up of glass, plastic, or another appropriate material. In some cases, the conduit(s) may be transparent or translucent so that the movable element within the conduit is viewable to an observer. In some embodiments, the conduit(s) are rigid, though, in various embodiments, the conduit(s) are flexible. The device may include a combination of rigid and flexible conduits. A conduit need not be cylindrical in shape as any suitable shape may be used.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A device for indicating a presence of a directional differential pressure between a first space and a second space separated from the first space by a barrier, the device comprising:
   a baseplate configured to be secured to the barrier such that the baseplate is not rotatable relative to the barrier while secured to the barrier;
   an inclined conduit connected to the baseplate and configured to be fluidically connected to the first space and the second space;
   wherein the inclined conduit is connected to the baseplate, and the inclined conduit is inclined at an angle relative to a horizontal plane when the baseplate is oriented vertically;
   wherein whenever the baseplate is secured to the barrier such that the baseplate is not rotatable relative to the barrier, the angle of the inclined conduit relative to the horizontal plane is not adjustable;
   wherein the device is configured such that no part of the device protrudes into the barrier when the device is mounted to a flat, vertical barrier having an opening in the barrier; and at least one movable element disposed within the inclined conduit and movable from a first, vertically lower region of the inclined conduit to a second, vertically higher region of the inclined conduit in response to the directional differential pressure between the first space and the second space being greater than a threshold differential pressure.

2. The device of claim 1, further comprising a pitch indicator and a roll indicator.

3. The device of claim 2, wherein the roll indicator is configured to indicate a roll orientation of the baseplate, and the pitch indicator comprises a level, wherein the level is arranged such that when the roll indicator indicates that the baseplate is oriented at the roll orientation, the level is configured to indicate whether the inclined conduit is oriented at an angle relative to the horizontal plane.

4. The device of claim 1, further comprising a conduit support for the inclined conduit, the conduit support being integrally formed with the baseplate.

5. The device of claim 1, wherein the at least one movable element comprises a ball.

6. The device of claim 1, wherein the inclined conduit has a section within which the at least one movable element is free to travel, and a longitudinal direction of the section is transverse to the baseplate.

7. The device of claim 1, wherein the inclined conduit has a section within which the at least one movable element is free to travel, and a longitudinal direction of the section is parallel to the baseplate.

8. A device for indicating a presence of a directional differential pressure between a first space and a second space separated from the first space by a barrier, the device comprising:
- a baseplate configured to be secured to the barrier such that the baseplate is not rotatable relative to the barrier while secured;
- an inclined conduit connected to the baseplate and configured to be fluidically connected to the first space and the second space;
- wherein the inclined conduit is inclined at an angle relative to a horizontal plane when the baseplate is oriented vertically;
- a roll indicator configured to indicate a roll orientation of the baseplate;
- wherein the baseplate includes a plurality of baseplate mounting component sets configured to be aligned with a set of barrier mounting components;
- wherein the baseplate mounting component sets are arranged such that the baseplate is securable to the barrier in a first roll orientation by aligning a first set of baseplate mounting components of the plurality of baseplate mounting component sets with a first barrier mounting component set, and securing the baseplate to the barrier using the first set of baseplate mounting components and the first set of barrier mounting components;
- wherein the baseplate mounting component sets are arranged such that the baseplate is securable to the barrier in a second roll orientation, different from the first roll orientation, by aligning the first barrier mounting component set with a second baseplate mounting component set other than the first baseplate mounting component set, and securing the baseplate to the barrier using the first set of barrier mounting components and the second set of baseplate mounting components; and
- at least one movable element disposed within the inclined conduit and movable from a first, vertically lower region of the inclined conduit to a second, vertically higher region of the inclined conduit in response to the directional differential pressure between the first space and the second space being greater than a threshold differential pressure.

9. The device of claim 8, wherein the inclined conduit is connected to the baseplate, and whenever the baseplate is secured to the barrier such that the baseplate is not rotatable relative to the barrier, the angle of the inclined conduit relative to the horizontal plane is not adjustable.

10. The device of claim 8, wherein the first set of baseplate mounting components comprises a first mounting hole and a second mounting hole in the baseplate, and the second set of baseplate mounting components comprises a third mounting hole and a fourth mounting hole in the baseplate.

11. The device of claim 10, wherein the first mounting hole and the third mounting hole are the same radial distance from a center of the baseplate.

12. The device of claim 8, further comprising a pitch indicator configured to indicate whether the device is at a pitch relative to the horizontal plane.

13. The device of claim 8, wherein the plurality of baseplate mounting component sets comprises at least three sets of baseplate mounting components.

14. The device of claim 13, wherein each set of the baseplate mounting components comprises a pair of baseplate mounting holes.

15. The device of claim 8, further comprising an additional conduit which is configured to at least partially penetrate the barrier.

16. The device of claim 15, wherein the inclined conduit is inclined at an angle relative to the additional conduit.

17. The device of claim 8, wherein the at least one movable element comprises a ball.

18. The device of claim 8, wherein the inclined conduit has a section within which the at least one movable element is free to travel, and a longitudinal direction of the section is transverse to the baseplate.

19. The device of claim 8, wherein the inclined conduit has a section within which the at least one movable element is free to travel, and a longitudinal direction of the section is parallel to the baseplate.

20. The device of claim 8, wherein the device is configured such that no part of the device protrudes into the barrier when the device is mounted to a flat, vertical barrier having an opening in the barrier.

21. The device of claim 8, further comprising a conduit support for the inclined conduit, the conduit support being arranged to at least partially hide the at least one movable element.

22. A device for indicating a presence of a directional differential pressure between a first space and a second space separated from the first space by a barrier, the device comprising:
- a baseplate configured to be secured to the barrier such that the baseplate is not rotatable relative to the barrier while secured to the barrier;
- an inclined conduit connected to the baseplate and configured to be fluidically connected to the first space and the second space;
- wherein the inclined conduit is inclined at an angle relative to a horizontal plane when the baseplate is oriented vertically;
- wherein the baseplate includes a first arc-shaped slot and a second arc-shaped slot configured to receive a first fastener and a second fastener, respectively, the first arc-shaped slot and the second arc-shaped slot being arranged such that with the first fastener received in the first arc-shaped slot and partially inserted into the barrier at a first barrier mounting location, and with the second fastener received in the second arc-shaped slot and partially inserted into the barrier at a second barrier mounting location, the baseplate is rotatable relative to the barrier;

wherein the baseplate is configured to be secured to the barrier when the first fastener and the second fastener are tightened against the baseplate; and at least one movable element disposed within the inclined conduit and movable from a first, vertically lower region of the inclined conduit to a second, vertically higher region of the inclined conduit in response to the directional differential pressure between the first space and the second space being greater than a threshold differential pressure.

23. The device of claim 22, further comprising a pitch indicator configured to indicate whether the device is at a pitch relative to the horizontal plane and a roll indicator configured to indicate a roll orientation of the baseplate.

24. The device of claim 22, further comprising a conduit support for the inclined conduit, the conduit support being integrally formed with the baseplate.

25. The device of claim 22, further comprising an additional conduit which is configured to at least partially penetrate the barrier.

26. The device of claim 25, wherein the inclined conduit is inclined at an angle relative to the additional conduit.

27. The device of claim 22, wherein the inclined conduit has a section within which the at least one movable element is free to travel, and a longitudinal direction of the section is transverse to the baseplate.

28. The device of claim 22, wherein the inclined conduit has a section within which the at least one movable element is free to travel, and a longitudinal direction of the section is parallel to the baseplate.

29. The device of claim 22, wherein the device is configured such that no part of the device protrudes into the barrier when the device is mounted to a flat, vertical barrier having an opening in the barrier.

30. The device of claim 22, wherein whenever the baseplate is secured to the barrier such that the baseplate is not rotatable relative to the barrier, the angle of the inclined conduit relative to the horizontal plane is not adjustable.

* * * * *